US012692940B1

(12) United States Patent　　(10) Patent No.:　US 12,692,940 B1
Ramasamy et al.　　　　　　　　(45) Date of Patent:　　　Jul. 28, 2026

(54) MITIGATION SLEEVE

(71) Applicant: Lennox Industries Inc., Richardson, TX (US)

(72) Inventors: Surendran Ramasamy, Chennai (IN); Glenn William Kowald, Carrollton, TX (US); Praveen Kumar Vallurupalli, Frisco, TX (US); Darcy Quentin Easterling, Flower Mound, TX (US); James Frank Timbs, Winona, MS (US); Rakesh Goel, Irving, TX (US); Ben Alcocer, Terrell, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 19/037,984

(22) Filed: Jan. 27, 2025

(51) Int. Cl.
　　F16J 15/02　　　　(2006.01)
　　F16J 3/04　　　　(2006.01)
(52) U.S. Cl.
　　CPC .............. F16J 15/02 (2013.01); F16J 3/042 (2013.01)
(58) Field of Classification Search
　　CPC ..... F16J 3/042; F16J 15/02; F16J 3/04; F16D 3/845
　　See application file for complete search history.

(56) References Cited

U.S. PATENT DOCUMENTS

| 5,015,002 | A | * | 5/1991 | Goodman | ................. | F16F 9/38 |
| | | | | | | 139/121 |
| 11,415,179 | B2 | * | 8/2022 | Wellman | ................. | F16D 3/845 |

| 2005/0085305 | A1 | * | 4/2005 | Wehner | ................... | F16D 3/845 |
| | | | | | | 464/175 |
| 2011/0159971 | A1 | * | 6/2011 | Deisinger | ................ | F16J 3/042 |
| | | | | | | 464/175 |
| 2013/0115834 | A1 | * | 5/2013 | Stone | ....................... | B63H 7/00 |
| | | | | | | 440/112 |
| 2014/0125015 | A1 | * | 5/2014 | Choi | ..................... | F16J 15/021 |
| | | | | | | 277/634 |
| 2016/0319887 | A1 | * | 11/2016 | Hector | .................... | F16D 3/845 |
| 2019/0346042 | A1 | * | 11/2019 | Deisinger | .................. | F16J 3/04 |

(Continued)

FOREIGN PATENT DOCUMENTS

| JP | 2008309223 | A | * | 12/2008 | ............... | F16J 3/042 |
| JP | 2014185656 | A | * | 10/2014 | ............... | F16J 15/52 |
| JP | 2015055298 | A | * | 3/2015 | ............... | F16J 3/043 |

*Primary Examiner* — Eugene G Byrd
(74) *Attorney, Agent, or Firm* — Baker Botts L.L.P.

(57)　　　　　　　ABSTRACT

A refrigerant leak mitigation sleeve includes a flexible sleeve body comprising bellow elements, wherein the flexible sleeve body includes a cavity configured to contain refrigerant fluid and the bellow elements are configured to expand or contract. The mitigation sleeve includes a tube clamp interface at a first end of the flexible sleeve body, wherein the tube clamp interface comprises a first diameter and is configured to receive a tube. The mitigation sleeve includes a sealing collar at a second end of the flexible sleeve body. The mitigation sleeve includes at the collar end a passageway for refrigerant leaks to be directed back into the HVAC equipment cabinet. The mitigation sleeve includes a gusset positioned between the sealing collar and the flexible sleeve body, wherein the gusset comprises stiffening ribs. The mitigation sleeve further includes a deformable engagement collar connected to the sealing collar on a side opposite to the gusset.

21 Claims, 14 Drawing Sheets

(56)          References Cited

U.S. PATENT DOCUMENTS

2019/0353209 A1 *  11/2019  Deisinger  ............... F16D 3/845
2021/0262530 A1 *   8/2021  Fernandez Cahuantzi  ..................
                                                        F16J 3/046
2022/0161702 A1 *   5/2022  Justman  ................... B60N 2/50
2025/0052285 A1 *   2/2025  Duda  ................. F16C 11/0671

* cited by examiner

SECTION A - A

⌀ .188 x 2 THRU [Ce]
1.800 PCD

⌀ 2.35

⌀ 2.25

780

MITIGATION SLEEVE

TECHNICAL FIELD

The present disclosure relates generally to heating, ventilation, and air conditioning (HVAC), and more specifically, to a refrigerant leak mitigation sleeve for an HVAC system.

BACKGROUND

Refrigerant is a chemical fluid that transfers heat in an HVAC (heating, ventilation, and air conditioning) system to cool or heat a space. There are many different types of refrigerants, including chlorofluorocarbons (CFCs), hydrofluorocarbons (HFCs), and hydrofluoroolefins (HFOs) to name a few. One type of refrigerant which has recently gained widespread adoption is deemed to be mildly flammable, hence leaks in the unitary equipment or tubing connecting indoor and outdoor sections require careful consideration to mitigate potential for ignition of the refrigerant resulting in a hazardous condition.

SUMMARY

A refrigerant coil joint leak in an HVAC system can be caused by a number of things. For example, corrosion can lead to cracks and holes that allow refrigerant to leak. Weakened joints and connections can erode or thin out, allowing refrigerant to leak. Improper installation, e.g., incorrectly fitted parts or components, can allow refrigerant to escape. Abrasions can wear down the coils or tubing over time, which causes refrigerant coil joint leak. Poorly brazed or soldered joints can also cause refrigerant coil joint leak. The mitigation sleeve disclosed in the present application provides a technical solution to mitigate refrigerant leaks in response to the problems discussed above.

In one embodiment, the disclosed mitigation sleeve can accommodate multiple different copper tube size (e.g., 1⅛ inches, ⅞ inches and ¾ inches). The disclosed mitigation sleeve also has flexible bellows, which can accommodate up to 90-degree tubing bends and compress for reduced sized packaging. The disclosed mitigation sleeve is easy to install and detachable for easy field service. In addition, the rugged design of the mitigation sleeve can safely contain high pressure liquid or vapor refrigerant leaks. The disclosed mitigation sleeve has screw attachment to the AC coil and a clamp at the tube to keep the sleeve in place during high pressure leaks or inadvertent displacement during servicing. Furthermore, the disclosed mitigation sleeve has a drip pan extension, which ensures any condensate or liquid refrigerant goes safely into the AC coil drain pan. The disclosed mitigation sleeve is molded in rubber, such as Ethylenepropylene diene monomer (EPDM).

The disclosed mitigation sleeve can prevent, or at least mitigate the effects of, a braze or mechanical joint leak at the coil from leaking refrigerant into the area around the furnace or coil. Prior to the widespread adoption of flammable refrigerants a joint leak was not generally considered a hazard and thus not usually mitigated. The integrated design of the disclosed mitigation sleeve reduces risks of misapplication in the field during installation and servicing. In this design, an installer or field technician can easily remove the sleeves from the unit by removing the screws and loosening the clamp while servicing. The disclosed mitigation sleeve has common designs for all installation configurations (e.g., up flow, horizontal flow, and downflow) reduces risk of a wrong part being applied and reduces factory and customer inventory of repair part kits.

In one embodiment, the disclosed mitigation sleeve includes a flexible sleeve body comprising a plurality of bellow elements. The flexible sleeve body includes a cavity configured to contain fluid, such as leaked refrigerant. The plurality of bellow elements are configured to expand or contract. The disclosed mitigation sleeve also includes a tube clamp interface at a first end of the flexible sleeve body. The tube clamp interface includes a first diameter and is configured to receive a tube. The disclosed mitigation sleeve additionally includes a sealing collar at a second end of the flexible sleeve body. The mitigation sleeve also includes at the collar end a passageway for refrigerant leaks to be directed back into the HVAC equipment cabinet. The disclosed mitigation sleeve also includes a gusset positioned between the sealing collar and the flexible sleeve body. The gusset includes a plurality of stiffening ribs. The disclosed mitigation sleeve further includes a deformable engagement collar connected to the sealing collar on a side opposite to the gusset.

In one embodiment, the tube clamp interface includes an inner surface. The first diameter is a measurement of the inner surface of the tube clamp interface. The tube clamp interface is configured to receive a tube comprising an outer surface. The outer surface of the tube has a second diameter. The first diameter is greater than the second diameter by a threshold amount.

In one embodiment, the tube clamp interface includes a first sub tube clamp interface having a second diameter and a second sub tube clamp interface having a third diameter. The first sub tube clamp interface includes a first inner surface and the second sub tube clamp interface includes a second inner surface. The second diameter is a measurement of the first inner surface of the first sub tube clamp interface and the third diameter is a measurement of the second inner surface of the second sub tube clamp interface. The first sub tube clamp interface is configured to receive a first tube comprising a first outer surface. The first outer surface of the first tube has a fourth diameter, the second diameter being greater than the fourth diameter by a threshold amount. The second sub tube clamp interface is configured to receive a second tube comprising a second outer surface. The second outer surface of the second tube has a fifth diameter, the third diameter being greater than the fifth diameter by the threshold amount.

In one embodiment, the tube clamp interface includes a recess on a surface of the tube clamp interface. The recess is configured to align a hose clamp when the hose clamp is fixed onto the tube clamp interface.

In one embodiment, the deformable engagement collar connected to the sealing collar is configured to seal against an air conditioning (AC) cabinet associated with an AC system. The sealing collar further includes one or more screw holes configured to accommodate one or more screws that can be fixed to the AC cabinet.

In one embodiment, the deformable engagement collar connected to the sealing collar is configured to seal against an air conditioning (AC) cabinet associated with an AC system. The mitigation sleeve also includes at the collar end a passageway for refrigerant leaks to be directed back into the HVAC equipment cabinet. The mitigation sleeve further includes a drip pan extension connected to the sealing collar. The drip pan extension is configured to direct liquid into a drain pan associated with the AC system.

In one embodiment, the deformable engagement collar connected to the sealing collar is configured to seal against an air conditioning (AC) cabinet associated with an AC system. The mitigation sleeve further includes a drip pan extension tongue connected to the drip pan extension. The drip pan extension tongue tilts downwards to direct liquid into the drip pan when the mitigation sleeve is connected to the AC cabinet.

In one embodiment, a cross-section of the drip pan extension has a "D" shape.

In one embodiment, a cross-section of the drip pan extension has a circular shape.

In one embodiment, a cross-section of the drip pan extension has an oval shape.

In one embodiment, the flexible sleeve body, the tube clamp interface, the sealing collar, the gusset, the deformable engagement collar, and the drip pan extension are integrated as a unified sleeve.

In one embodiment, at least a portion of the mitigation sleeve is formed from molded rubber.

In one embodiment, the flexible sleeve body is bendable.

In one embodiment, a volume size of the cavity of the flexible sleeve body is configured to accommodate insulation surrounding the tube connected to the tube clamp interface that extends into the cavity of the flexible sleeve body. The tube is connected via a braze joint within the cavity to an air conditioning (AC) coil associated with an AC system. The tube and AC coil are configured to allow refrigerant to flow through the tube and AC coil. The cavity of the flexible sleeve body is configured to contain any refrigerant leak from the braze joint.

In one embodiment, the plurality of stiffening ribs of the gusset are configured to provide rigidity to the sealing collar.

In one embodiment, the deformable engagement collar connected to of the sealing collar is configured to seal against an air conditioning (AC) cabinet associated with an AC system. The deformable engagement collar is configured to deform to enable the sealing collar to seal against the AC cabinet.

In one embodiment, the disclosed mitigation sleeve includes a flexible sleeve body comprising a plurality of bellow elements. The flexible sleeve body includes a cavity configured to contain fluid leaks and the plurality of bellow elements are configured to expand or contract. The disclosed mitigation sleeve also includes a tube clamp interface at a first end of the flexible sleeve body. The tube clamp interface includes a plurality of sub tube clamp interfaces having a plurality of respective diameters. The plurality of sub tube clamp interfaces are configured to receive a plurality of respective tubes. The disclosed mitigation sleeve additionally includes a sealing collar at a second end of the flexible sleeve body. The sealing collar further includes one or more screw holes configured to accommodate one or more screws that can be fixed to an AC cabinet associated with an AC system. The mitigation sleeve also includes at the collar end a passageway for refrigerant leaks to be directed back into the HVAC equipment cabinet. The disclosed mitigation sleeve also includes a gusset positioned between the sealing collar and the flexible sleeve body. The gusset includes a plurality of stiffening ribs. The disclosed mitigation sleeve additionally includes a deformable engagement collar connected to the sealing collar on a side opposite to the gusset. The deformable engagement collar is configured to seal against the AC cabinet. The disclosed mitigation sleeve further includes a drip pan extension connected to the sealing collar. The drip pan extension is configured to direct liquid into a drain pan associated with the AC system and a cross-section of the drip pan extension has a "D" shape.

In one embodiment, the disclosed mitigation sleeve includes a flexible sleeve body comprising a plurality of bellow elements. The flexible sleeve body includes a cavity configured to contain liquid and the plurality of bellow elements are configured to expand or contract. The disclosed mitigation sleeve further includes a tube clamp interface at a first end of the flexible sleeve body. The tube clamp interface includes a first diameter and is configured to receive a tube. The tube clamp interface includes a recess on a surface of the tube clamp interface and the recess is configured to align a hose clamp when the hose clamp is fixed onto the tube clamp interface. The disclosed mitigation sleeve additionally includes a sealing collar at a second end of the flexible sleeve body. The disclosed mitigation sleeve also includes a gusset positioned between the sealing collar and the flexible sleeve body. The gusset includes a plurality of stiffening ribs. The disclosed mitigation sleeve also includes a deformable engagement collar connected to the sealing collar on a side opposite to the gusset. The deformable engagement collar is configured to seal against an air conditioning (AC) cabinet associated with an AC system. The disclosed mitigation sleeve additionally includes a drip pan extension connected to the sealing collar. The disclosed mitigation sleeve further includes a drip pan extension tongue connected to the drip pan extension. The drip pan extension tongue tilts downwards to direct liquid into a drain pan associated with the AC system when the mitigation sleeve is connected to the AC cabinet.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, a refrigerant coil joint leak can occur in an HVAC system. This disclosure provides a mitigation sleeve with various embodiments to contain the leak.

Figure 1A:
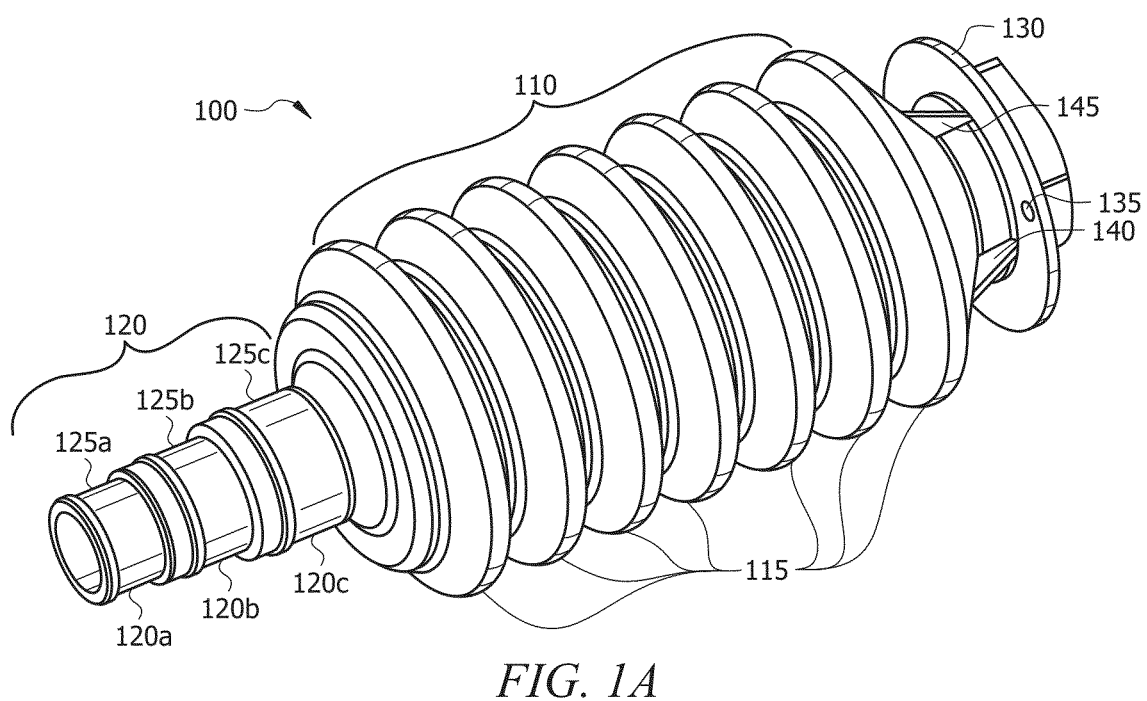
FIG. 1A illustrates an example first perspective view of a mitigation sleeve according to a first embodiment of the present disclosure.
Figure 1B:
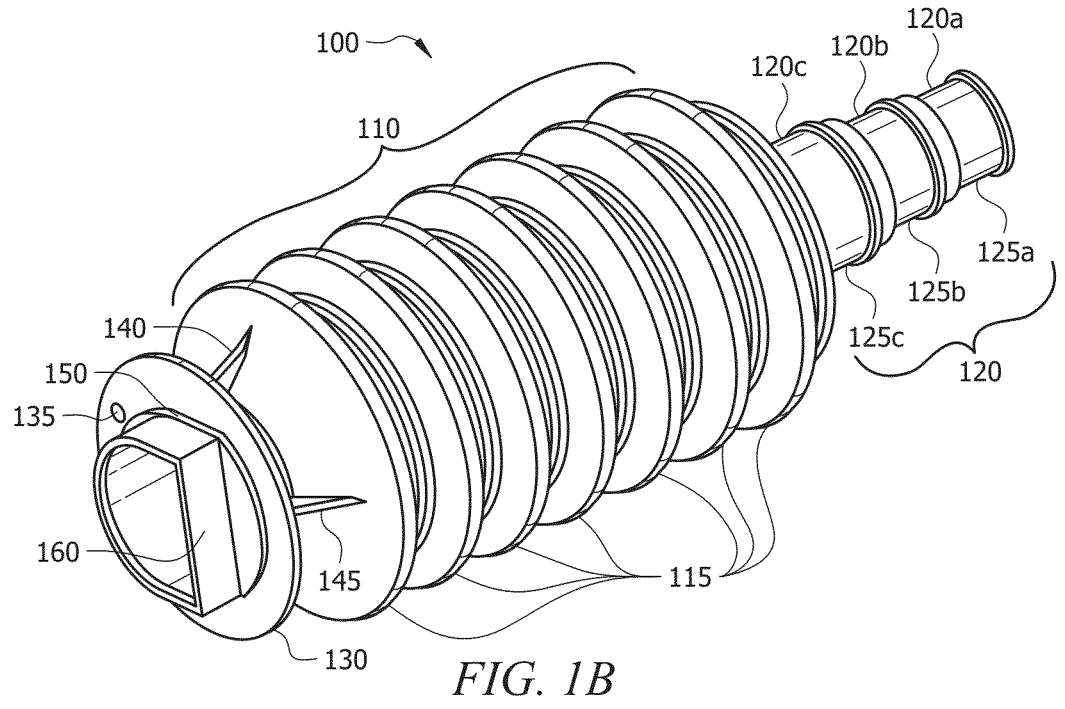
FIG. 1B illustrates an example second perspective view of the mitigation sleeve of FIG. 1A.

FIG. 1A illustrates an example first perspective view of a mitigation sleeve 100 according to a first embodiment of the present disclosure. FIG. 1B illustrates an example second perspective view of the mitigation sleeve 100 of FIG. 1A. Mitigation sleeve 100 comprises a flexible sleeve body 110, a tube clamp interface 120, a sealing collar 130, a gusset 140, a deformable engagement collar 150, and a drip pan extension 160. In one embodiment, the flexible sleeve body 110, the tube clamp interface 120, the sealing collar 130, the gusset 140, the deformable engagement collar 150, and the drip pan extension 160 are integrated as a unified sleeve. In other embodiments, one or more of these components can be fitted together to form the mitigation sleeve 100. At least a portion of mitigation sleeve 100 is formed from molded rubber. In some embodiments, mitigation sleeve 100 may not have all of the components listed and/or may have other elements instead of, or in addition to, those listed above.

Flexible sleeve body 110 includes a cavity configured to safely contain high pressure liquid or vapor refrigerant leaks. Flexible sleeve body 110 can be bent in different directions. Flexible sleeve body 110 further comprises a plurality of bellow elements 115. Bellow elements 115 are configured to expand or contract. Flexible sleeve body 110 can be compressed for storage.

Tube clamp interface 120 is at one end of flexible sleeve body 110 and is configured to connect to a tube through which refrigerant flows. In an embodiment, tube clamp interface 120 may have a plurality of sub tube clamp interfaces having a plurality of respective diameters. The plurality of sub tube clamp interfaces are configured to receive a plurality of respective tubes. As illustrated in FIG. 1A, tube clamp interface 120 may have three sub tube clamp interfaces with different diameters, e.g., sub tube clamp interface 120a with a ¾ inch diameter (0.75 inches, 1.905 cm), sub tube clamp interface 120b with a ⅞ inch diameter (0.875 inches, 2.2225 cm), and sub tube clamp interface 120c with a 1⅛ inch diameter (1.125 inches, 2.8575 cm). Other sub tube clamp interfaces 120 of different diameter sizes can also be implemented. As a result, tube clamp interface 120 can be connected to tubes with different diameters. For example, a user can directly connect tube clamp interface 120 to a tube with a diameter slightly less than ¾ inches. A user can remove (e.g., cut off) sub clamp interface 120a with the ¾-inch diameter so that the sub clamp interface 120b with the ⅞-inch diameter is exposed. and the user can then connect the sub clamp interface 120b with the ⅞-inch diameter to a tube with a diameter slightly less than ⅞ inches. A user can further remove sub clamp interface 120b with ⅞-inch diameter so that the sub clamp interface 120c with the 1⅛-inch diameter is exposed. The user can then connect the sub clamp interface 120c with the 1⅛-inch diameter to a tube with a diameter slightly less than 1⅛ inches.

Tube clamp interface 120 further has a recess 125 on the surface of tube clamp interface 120. Recess 125 is configured to align a hose clamp when the hose clamp is fixed onto tube clamp interface 120 so that the hose clamp will not move or fall off. For the embodiment where tube clamp interface 120 has multiple sub tube clamp interfaces, each of the sub tube clamp interfaces may have a respective recess 125. As illustrated in FIG. 1A, a recess 125a may be on the surface of sub tube clamp interface 120a; a recess 125b may be on the surface of sub tube clamp interface 120b; and a recess 125c may be on the surface of sub tube clamp interface 120c.

Sealing collar 130 is at the other end of flexible sleeve body 110. In one embodiment, sealing collar 130 is configured to seal against an AC cabinet associated with an AC system. In some embodiments, sealing collar 130 may further comprise screw holes 135 configured to accommodate screws that can be fixed to the AC cabinet. The screw attachment can help keep mitigation sleeve 100 in place during high pressure leaks or inadvertent displacement during service. In some other embodiments, sealing collar 130 may not comprise screw holes 135. Sealing collar 130 without screw holes 135 can have a positive engagement with the AC cabinet when mitigation sleeve 100 is snapped in the AC cabinet because deformable engagement collar 150 for these embodiments may be a round shape and more pronounced to help sealing collar 130 generate a sufficient seal in conjunction with the AC cabinet.

Gusset 140 is positioned between sealing collar 130 and flexible sleeve body 110. In some embodiments, gusset 140 may comprise a plurality of stiffening ribs 145 between sealing collar 130 and flexible sleeve body 110. Stiffening ribs 145 are configured to provide rigidity to sealing collar 130, allowing a user to apply pressure against gusset 140 without deforming it too much, if at all.

Deformable engagement collar 150 is connected to sealing collar 130 on a side opposite to gusset 140. Deformable engagement collar 150 can deform slightly so that it can help sealing collar 130 seal against an AC cabinet. When deformable engagement collar 150 is pushed into the opening on the AC cabinet, deformable engagement collar 150 can deform slightly so that it can fit into the opening. Once pushed in, deformable engagement collar 150 may return to its original form so that it can completely and tightly fill the opening, which can help sealing collar 130 create a secure and leak-proof connection between mitigation sleeve 100 and the AC cabinet.

Drip pan extension 160 is connected to sealing collar 130. Drip pan extension 160 is configured to direct liquid into a drain pan associated with the AC system, thereby facilitating any condensate or liquid refrigerant to be safely fed into the drain pan. In some embodiments, the cross-section of drip pan extension 160 may have a "D" shape, as illustrated in FIGS. 1A-1B and elsewhere. In this manner, a "D" shape may have a flat portion and a rounded portion with a planar cross-section resembling a letter "D", the fourth letter of the English alphabet. See also FIG. 1B near reference 160, FIG. 2B near reference 260, FIG. 4A near reference 460, etc. In some other embodiments, the cross-section of drip pan extension 160 may have a circular shape, an oval shape, or any suitable shape. The shape of the cross-section of drip pan extension 160 is configured to fit the opening of the drip pan in the AC cabinet. For example, if the opening of the drip pan is "D" shaped, the cross-section of drip pan extension 160 should be "D" shaped so that drip pan extension 160 can be inserted into the "D" shaped opening of the drip pan. As another example, if the opening of the drip pan is round, the cross-section of drip pan extension 160 should be round too so that drip pan extension 160 can be inserted into the round opening of the drip pan. Although FIGS. 1A-1B show that drip pan extension 160 has a particular length, drip pan extension 160 can have any suitable length, e.g., longer than the length shown in FIGS. 1A-1B or shorter than the length shown in FIGS. 1A-1B.

In an embodiment, the installation of mitigation sleeve 100 may follow the following procedure. To begin with, a user may need to determine the size of the tube that allows refrigerant to flow through. For a tube with diameter slightly less than ¾ inches, the user does not need to trim tube clamp interface 120. For a tube with diameter slightly less than ⅞ inches, the user can cut off sub tube clamp interface 120a accordingly to accommodate the tube. For a tube with diameter slightly less than 1⅛ inches, the user can cut off sub tube clamp interface 120a and sub tube clamp interface 120b accordingly to accommodate the tube.

The user can then slide mitigation sleeve 100 onto the refrigerant tube. Mitigation sleeve 100 should be at least two feet from the joint connecting the tube and AC coil to avoid damage during brazing of the connection if the tube and AC coil are connected using brazed connections.

For brazed connections, the user can position the refrigerant tube and make the brazed connection between the tube and AC coil following brazing guidelines. For braze-free connections, the user can position the refrigerant tube against the AC coil and follow the assembly instructions provided with a braze-free connector used to connect the tube and AC coil.

Using the insulation provided, the user can wrap the section of the tube next to the AC cabinet. The user can start at the AC coil and wrap the tube together with the braze joint for approximately 7 inches (17.78 cm). The user may need to make sure that insulation fits inside mitigation sleeve 100. The user can then slide mitigation sleeve 100 over the insulation and insert drip pan extension 160 of mitigation sleeve 100 into the "D" shaped opening of the drip pan in the AC cabinet. The user can hold gusset 140 and push deformable engagement collar 150 into the opening on the AC cabinet. Deformable engagement collar 150 can deform slightly so that it can help sealing collar 130 seal against the AC cabinet. The user can further secure mitigation sleeve 100 to the AC cabinet by installing screws onto the AC cabinet through screw holes 135 of sealing collar 130.

The user can then fix a hose clamp onto recess 125 of tube clamp interface 120 to secure the connection of mitigation sleeve 100 to the refrigerant tube.

Figure 2A:
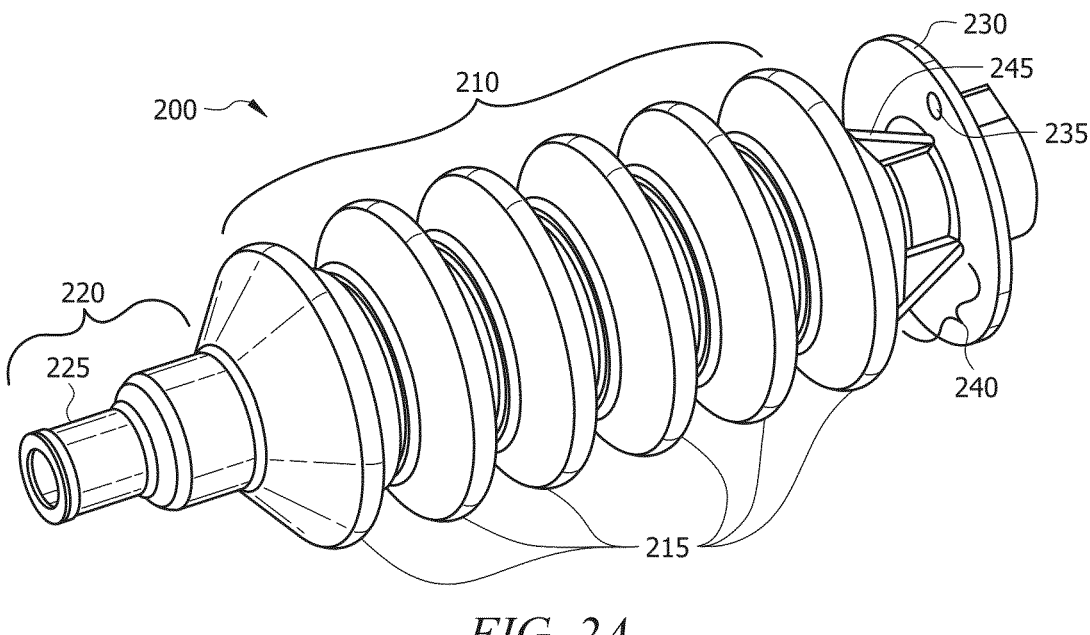
FIG. 2A illustrates an example first perspective view of a mitigation sleeve according to a second embodiment of the present disclosure.
Figure 2B:
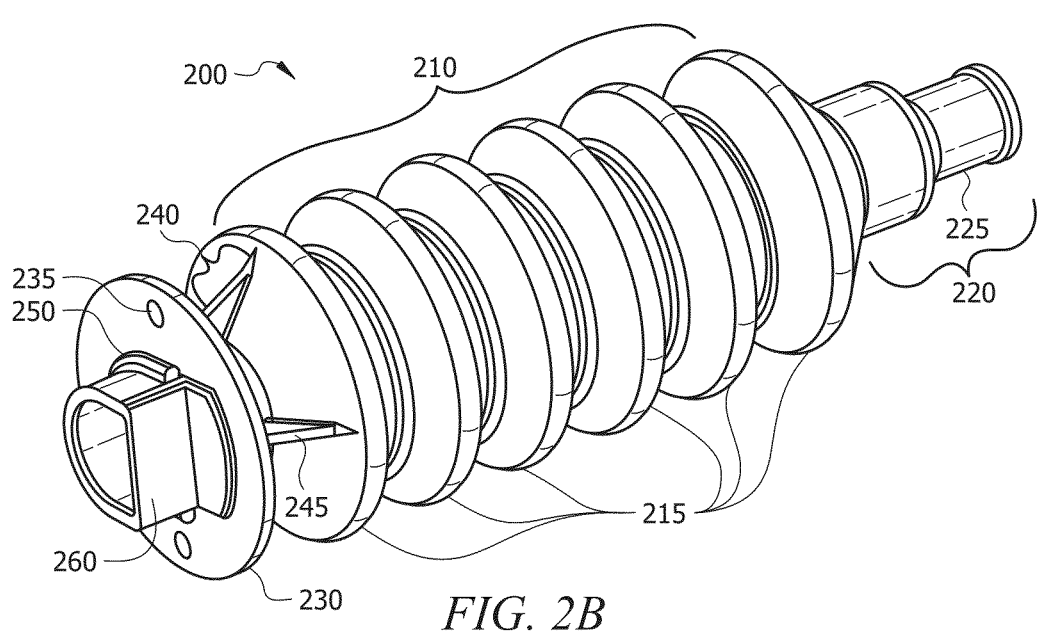
FIG. 2B illustrates an example second perspective view of the mitigation sleeve of FIG. 2A.

FIG. 2A illustrates an example first perspective view of a mitigation sleeve according to a second embodiment of the present disclosure. FIG. 2B illustrates an example second perspective view of the mitigation sleeve of FIG. 2A. Mitigation sleeve 200 comprises a flexible sleeve body 210, a tube clamp interface 220, a sealing collar 230, a gusset 240, a deformable engagement collar 250, and a drip pan extension 260. In one embodiment, flexible sleeve body 210, tube clamp interface 220, sealing collar 230, gusset 240, deformable engagement collar 250, and drip pan extension 260 are integrated as a unified sleeve. In other embodiments, one or more of these components can be fitted together to form the mitigation sleeve 200. At least a portion of mitigation sleeve 200 is formed from molded rubber. In some embodiments, the mitigation sleeve 200 may not have all of the components listed and/or may have other elements instead of, or in addition to, those listed above.

Flexible sleeve body 210 includes a cavity configured to safely contain high pressure liquid or vapor refrigerant leaks. Flexible sleeve body 210 can be bent in different directions. Flexible sleeve body 210 further comprises a plurality of bellow elements 215. Bellow elements 215 are configured to expand or contract. Flexible sleeve body 210 can be compressed for storage.

Tube clamp interface 220 is at one end of flexible sleeve body 210 and is configured to connect to a tube through which refrigerant flows. As illustrated in FIG. 2A, tube clamp interface 220 may have one diameter and can be connected to tubes with only one, appropriately sized diameter. Tube clamp interface 220 further has a recess 225 on the surface of tube clamp interface 220. Recess 225 is configured to align a hose clamp when the hose clamp is fixed onto tube clamp interface 220 so that the hose clamp will not move or fall off.

Scaling collar 230 is at the other end of flexible sleeve body 210. In one embodiment, sealing collar 230 is configured to seal against the AC cabinet. In some embodiments, sealing collar 230 may further comprise screw holes 235 configured to accommodate screws that can be fixed to the AC cabinet. The screw attachment can help keep mitigation sleeve 200 in place during high pressure leaks or inadvertent displacement during service. In some other embodiments, sealing collar 230 may not comprise screw holes 235. Sealing collar 130 without screw holes 235 can have a positive engagement with the AC cabinet when mitigation sleeve 200 is snapped in the AC cabinet because deformable engagement collar 250 for these embodiments may be a round shape and more pronounced to help sealing collar 230 generate enough seal against the AC cabinet.

Gusset 240 is positioned between sealing collar 230 and flexible sleeve body 210. In some embodiments, gusset 240 may comprise a plurality of stiffening ribs 245 between sealing collar 230 and flexible sleeve body 210. Stiffening ribs 245 are configured to provide rigidity to scaling collar 230, allowing a user to apply pressure against gusset 240 without deforming it too much, if at all.

Deformable engagement collar 250 is connected to sealing collar 230 on a side opposite to gusset 240. Deformable engagement collar 250 can deform slightly so that it can help sealing collar 230 seal against an AC cabinet. When deformable engagement collar 250 is pushed into the opening on the AC cabinet, deformable engagement collar 250 can deform slightly so that it can fit into the opening. Once pushed in, deformable engagement collar 250 may return to its original form so that it can completely and tightly fill the opening, which can help sealing collar 230 create a secure and leak-proof connection between mitigation sleeve 200 and the AC cabinet.

Drip pan extension 260 is connected to sealing collar 230. Drip pan extension 260 is configured to direct liquid into a drain pan associated with the AC system, thereby facilitating any condensate or liquid refrigerant to be safely fed into the drain pan. In some embodiments, the cross-section of drip pan extension 260 may have a "D" shape, as illustrated in FIG. 2A. In some other embodiments, the cross-section of drip pan extension 260 may have a circular shape, an oval shape, or any suitable shape. The shape of the cross-section of drip pan extension 260 is configured to fit the opening of the drip pan in the AC cabinet. For example, if the opening of the drip pan is "D" shaped, the cross-section of drip pan extension 260 should be "D" shaped so that drip pan extension 260 can be inserted into the "D" shaped opening of the drip pan. As another example, if the opening of the drip pan is round, the cross-section of drip pan extension 260 should be round too so that drip pan extension 260 can be inserted into the round opening of the drip pan. Although FIGS. 2A-2B show that drip pan extension 260 has a particular length, drip pan extension 260 can have any suitable length, e.g., longer than the length shown in FIGS. 2A-2B or shorter than the length shown in FIGS. 2A-2B.

In an embodiment, the installation of mitigation sleeve 200 may follow similar procedure described with reference to FIGS. 1A-1B except that the user does not need to trim tube clamp interface 220 as tube clamp interface 220 can be connected to tubes with only one, appropriately sized diameter. One other exception from the installation procedures described with reference to FIGS. 1A-1B, tubing associated with mitigation sleeve 200 does not require to be wrapped with insulation.

Figures 3A, 3B:
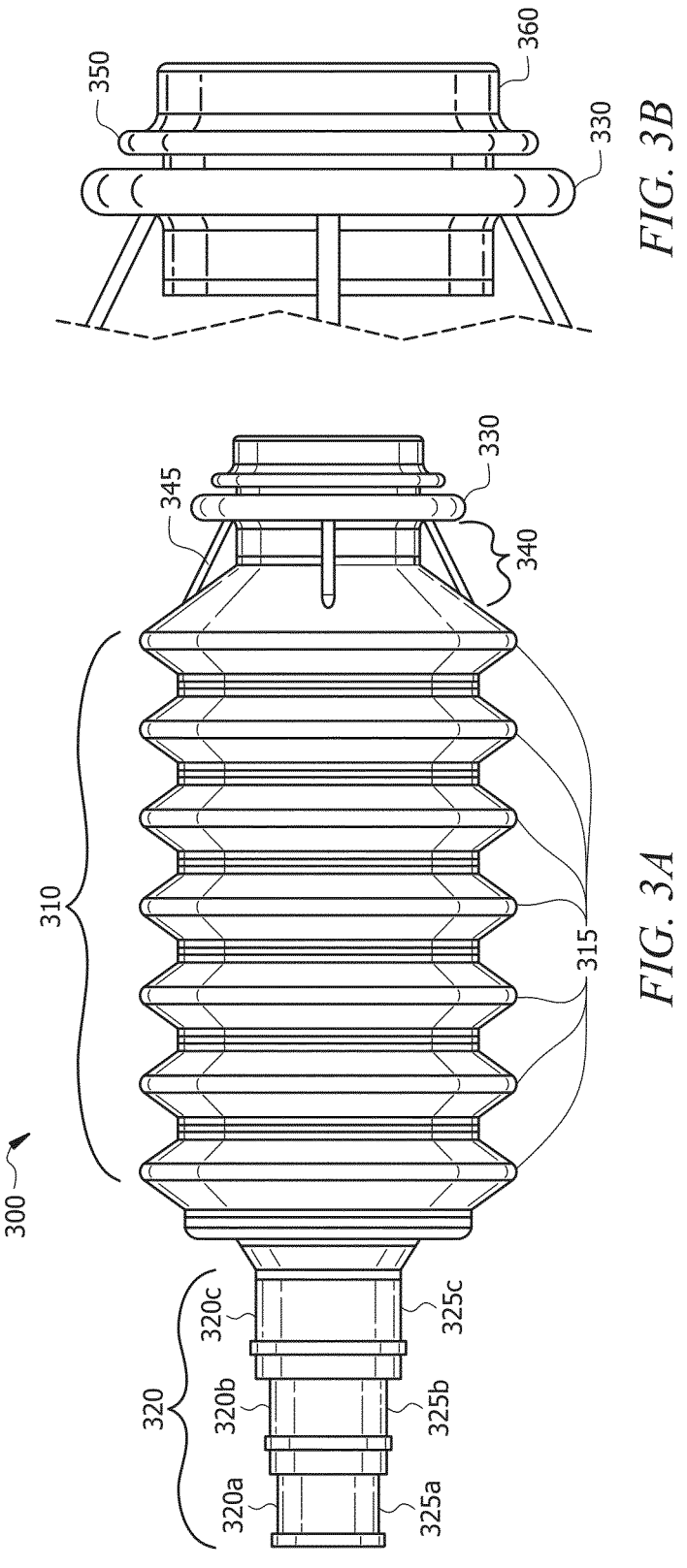
FIG. 3A illustrates an example first side view of a mitigation sleeve according to a third embodiment of the present disclosure.
FIG. 3B illustrates an example close-up view of one end of the mitigation sleeve of FIG. 3A.
Figure 3C:
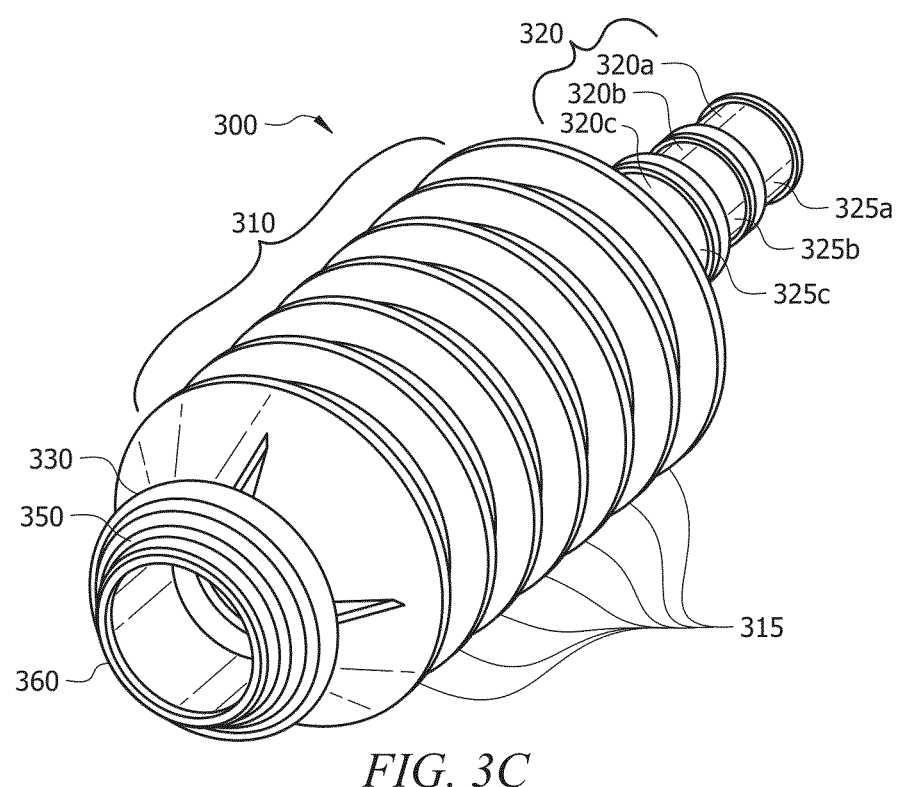
FIG. 3C illustrates an example first perspective view of the mitigation sleeve of FIG. 3A.
Figure 3D:
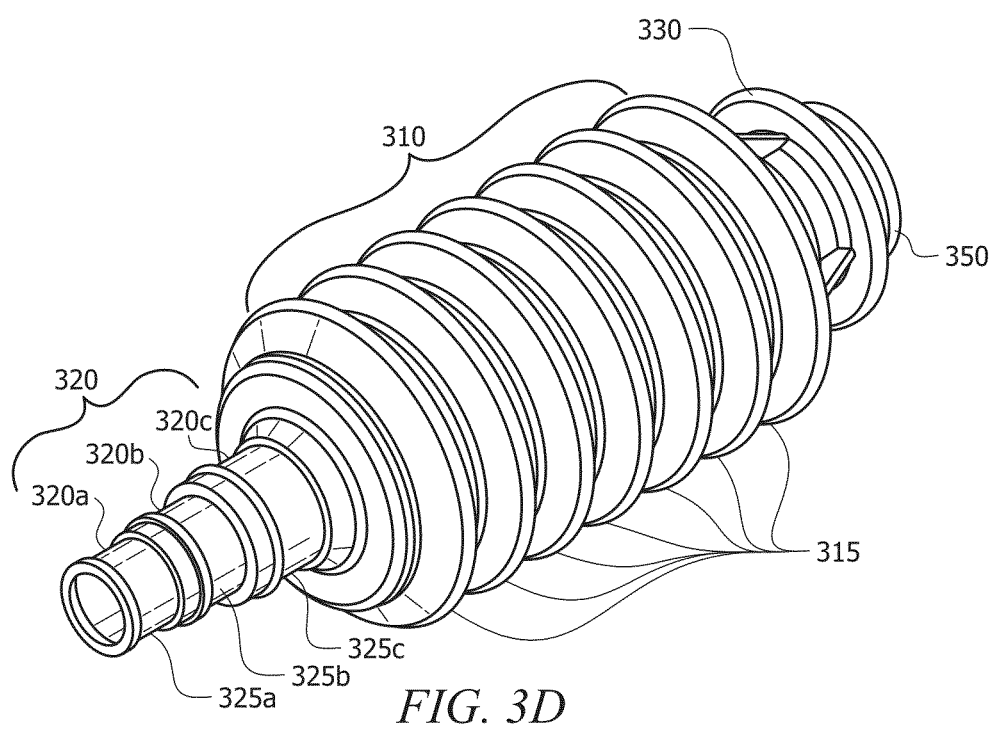
FIG. 3D illustrates an example second perspective view of a deformable engagement collar of the mitigation sleeve of FIGS. 3A-3C.

FIG. 3A illustrates an example first side view of a mitigation sleeve 300 according to a third embodiment of the present disclosure. FIG. 3B illustrates an example close-up view of one end of the mitigation sleeve 300 of FIG. 3A. FIG. 3C illustrates an example first perspective view of the mitigation sleeve 300 of FIG. 3A. FIG. 3D illustrates an example second perspective view of a deformable engagement collar of the mitigation sleeve of FIGS. 3A-3C.

Mitigation sleeve 300 comprises a flexible sleeve body 310, a tube clamp interface 320, a sealing collar 330, a gusset 340, a deformable engagement collar 350, and a drip pan extension 360. In one embodiment, flexible sleeve body 310, tube clamp interface 320, sealing collar 330, gusset 340, deformable engagement collar 350, and drip pan extension 360 are integrated as a unified sleeve. In other embodiments, one or more of these components can be fitted together to form the mitigation sleeve 300. At least a portion of mitigation sleeve 300 is formed from molded rubber. In some embodiments, mitigation sleeve 300 may not have all of the components listed and/or may have other elements instead of, or in addition to, those listed above.

Flexible sleeve body 310 includes a cavity configured to safely contain high pressure liquid or vapor refrigerant leaks. Flexible sleeve body 310 can be bent in different directions. Flexible sleeve body 310 further comprises a plurality of bellow elements 315. Bellow elements 315 are configured to expand or contract. Flexible sleeve body 310 can be compressed for storage.

Tube clamp interface 320 is at one end of flexible sleeve body 310 and is configured to connect to a tube through which refrigerant flows. As illustrated in FIG. 3A, tube clamp interface 320 may have three sub tube clamp interfaces with different diameters and can be connected to tubes with different diameters. For example, a user can connect sub tube clamp interface 320a to a tube with a first diameter. A user can remove (e.g., cut off) sub clamp interface 320a and then connect sub tube clamp interface 320b to a tube with a second diameter that is larger than the first diameter. A user can further remove sub clamp interface 320c and then connect tube clamp interface 320 to a tube with a third diameter that is larger than the second diameter.

Tube clamp interface 320 further has a recess 325 on the surface of the tube clamp interface 320. The recess 325 is configured to align a hose clamp when the hose clamp is fixed onto the tube clamp interface 320 so that the hose clamp will not move or fall off. As illustrated in FIG. 3A, a recess 325a may be on the surface of sub tube clamp interface 320a, a recess 325b may be on the surface of sub tube clamp interface 320b, and a recess 325c may be on the surface of sub tube clamp interface 320c.

Sealing collar 330 is at the other end of flexible sleeve body 310. In one embodiment, sealing collar 330 is configured to seal against the AC cabinet. In the embodiment illustrated in FIGS. 3A-3D, scaling collar 330 does not comprise screw holes. Sealing collar 330 can have a positive engagement with the AC cabinet when mitigation sleeve 300 is snapped in the AC cabinet because deformable engagement collar 350 is a round shape and more pronounced to help sealing collar 330 generate a sufficient seal in conjunction with the AC cabinet.

Gusset 340 is positioned between the sealing collar 330 and the flexible sleeve body 310. The gusset 340 may comprise a plurality of stiffening ribs 345 between sealing collar 330 and flexible sleeve body 310. Stiffening ribs 345 are configured to provide rigidity to scaling collar 330, allowing a user to apply pressure against gusset 340 without deforming it too much, if at all.

Deformable engagement collar 350 is connected to sealing collar 330 on a side opposite to gusset 340. Deformable engagement collar 350 can deform slightly to snap mitigation sleeve 300 in the AC cabinet and help sealing collar 330 seal against the AC cabinet. When deformable engagement collar 350 is pushed into the opening on the AC cabinet, deformable engagement collar 350 can deform slightly so that it can fit into the opening. Once pushed in, deformable engagement collar 350 may return to its original form so that it can completely and tightly fill the opening, which can help sealing collar 330 create a secure and leak-proof connection between mitigation sleeve 300 and the AC cabinet.

Drip pan extension 360 is connected to sealing collar 330. Drip pan extension 360 is configured to direct liquid into a drain pan associated with the AC system. In the embodiment illustrated in FIGS. 3A-3D, the cross-section of drip pan extension 360 has a round shape. In some other embodiments, the cross-section of drip pan extension 360 may have a "D" shape, an oval shape, or any suitable shape. The shape of the cross-section of drip pan extension 360 is configured to fit the opening of the drip pan in the AC cabinet. For example, if the opening of the drip pan is "D" shaped, the cross-section of drip pan extension 360 should be "D" shaped so that drip pan extension 360 can be inserted into the "D" shaped opening of the drip pan. As another example, if the opening of the drip pan is round, the cross-section of drip pan extension 360 should be round too so that drip pan extension 360 can be inserted into the round opening of the drip pan. Although FIGS. 3A-3B show that drip pan extension 360 has a particular length, drip pan extension 360 can have any suitable length, e.g., longer than the length shown in FIGS. 3A-3B or shorter than the length shown in FIGS. 3A-3B.

In an embodiment, the installation of mitigation sleeve 300 may follow the following procedure. To begin with, a user may need to determine the size of the tube that allows refrigerant to flow through. For a tube with diameter slightly less than ¾ inches, the user does not need to trim tube clamp interface 320. For a tube with diameter slightly less than ⅞ inches, the user can cut off sub tube clamp interface 320a accordingly to accommodate the tube. For a tube with diameter slightly less than 1⅛ inches, the user can cut off sub tube clamp interface 320a and sub tube clamp interface 320b accordingly to accommodate the tube.

The user can then slide mitigation sleeve 300 onto the refrigerant tube. Mitigation sleeve 300 should be at least two feet from the joint connecting the tube and AC coil to avoid damage during brazing of the connection if the tube and AC coil are connected using brazed connections.

For brazed connections, the user can position the refrigerant tube and make the brazed connection between the tube and AC coil following brazing guidelines. For braze-free connections, the user can position the refrigerant tube against the AC coil and follow the assembly instructions provided with a braze-free connector used to connect the tube and AC coil.

Using the insulation provided, the user can wrap the section of the tube next to the AC cabinet. The user can start at the AC coil and wrap the tube together with the braze joint for approximately 7 inches. The user may need to make sure that insulation fits inside mitigation sleeve 300. The user can then slide mitigation sleeve 300 over the insulation and insert drip pan extension 360 of mitigation sleeve 300 into the round shaped opening of the drip pan in the AC cabinet. The user can hold gusset 340 and push deformable engagement collar 350 into the opening on the AC cabinet. Deformable engagement collar 350 can deform slightly so that it can help sealing collar 330 seal against the AC cabinet. Because deformable engagement collar 350 is round and more pronounced, sealing collar 330 can be securely sealed against the AC cabinet without screws.

The user can then fix a hose clamp onto recess 325 of tube clamp interface 320 to secure the connection of mitigation sleeve 300 to the refrigerant tube.

Figure 4A:
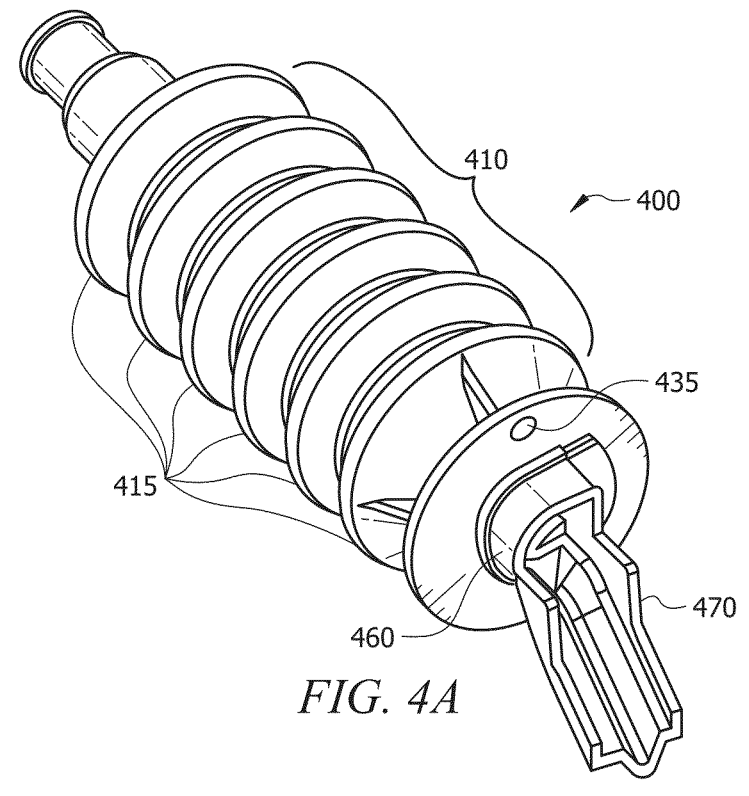
FIG. 4A illustrates an example first perspective view of a mitigation sleeve according to a fourth embodiment of the present disclosure.
Figure 4B:
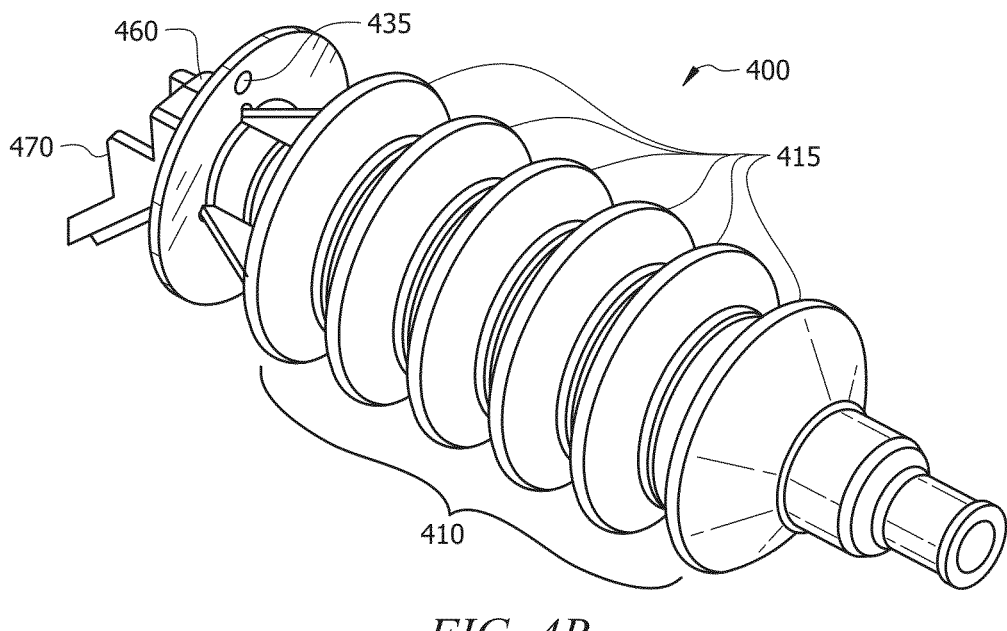
FIG. 4B illustrates an example second perspective view of the mitigation sleeve of FIG. 4A.
Figures 4C, 4D, 4E:
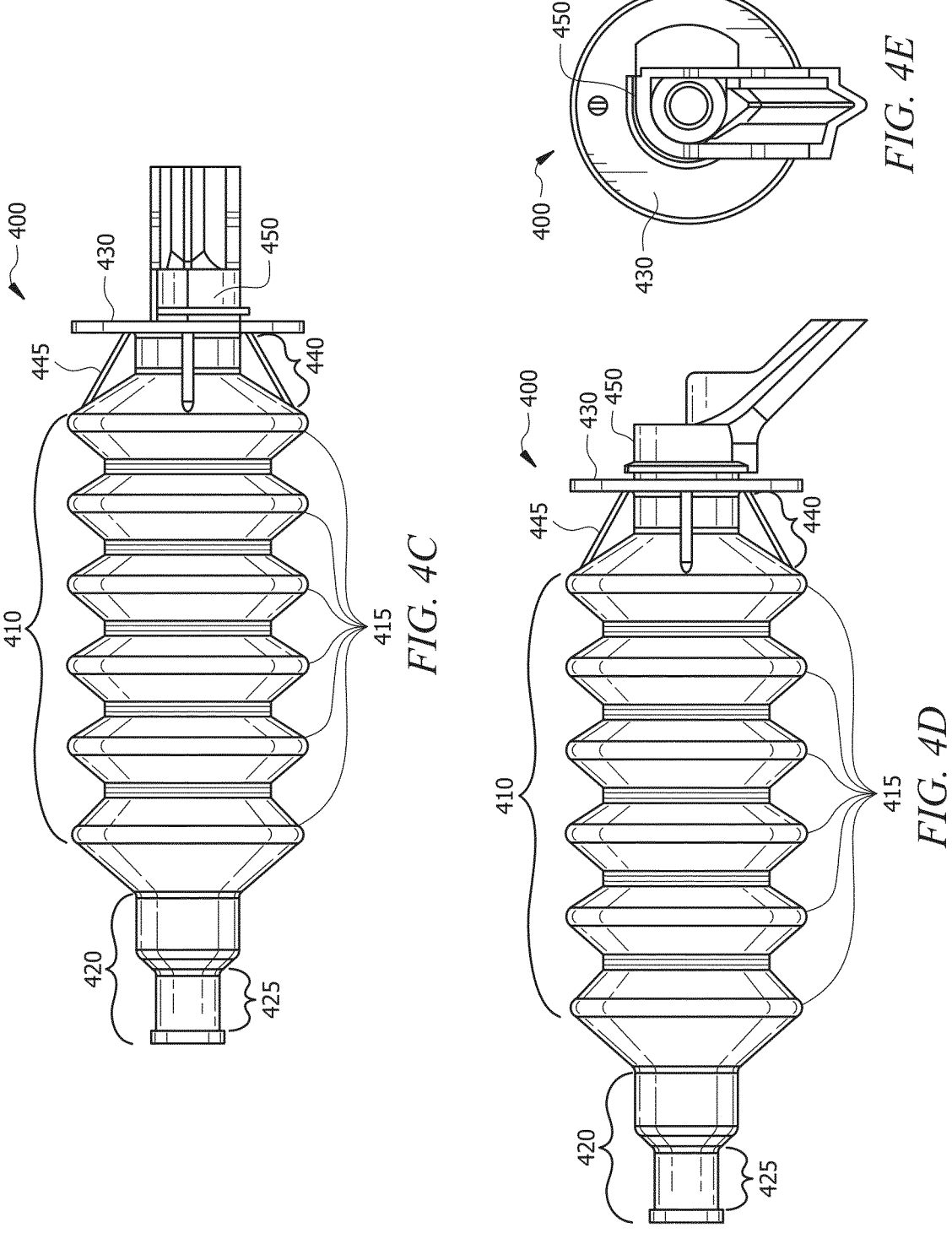
FIG. 4C illustrates an example first top view of the mitigation sleeve of FIGS. 4A-4B.
FIG. 4D illustrates an example side view of the mitigation sleeve of FIGS. 4A-4C.
FIG. 4E illustrates an example front view of a sealing collar, a drip pan extension, and a drip pan extension tongue of the mitigation sleeve of FIGS. 4A-4D.

FIG. 4A illustrates an example first perspective view of a mitigation sleeve 400 according to a fourth embodiment of the present disclosure. FIG. 4B illustrates an example second perspective view of the mitigation sleeve 400 of FIG. 4A. FIG. 4C illustrates an example first top view of the mitigation sleeve 400 of FIGS. 4A-4B. FIG. 4D illustrates an example side view of the mitigation sleeve 400 of FIGS. 4A-4C. FIG. 4E illustrates an example front view of a scaling collar, a drip pan extension, and a drip pan extension tongue of the mitigation sleeve of FIGS. 4A-4D.

Mitigation sleeve 400 comprises a flexible sleeve body 410, a tube clamp interface 420, a sealing collar 430, a gusset 440, a deformable engagement collar 450, a drip pan extension 460, and a drip pan extension tongue 470. In one embodiment, flexible sleeve body 410, tube clamp interface 420, scaling collar 430, gusset 440, deformable engagement collar 450, drip pan extension 460, and drip pan extension tongue 470 are integrated as a unified sleeve. In other embodiments, one or more of these components can be fitted together to form the mitigation sleeve 400. At least a portion of mitigation sleeve 400 is formed from molded rubber. In some embodiments, mitigation sleeve 400 may not have all of the components listed and/or may have other elements instead of, or in addition to, those listed above.

Flexible sleeve body 410 includes a cavity configured to safely contain high pressure liquid or vapor refrigerant leaks. Flexible sleeve body 410 can be bent in different directions. Flexible sleeve body 410 further comprises a plurality of bellow elements 415. Bellow elements 415 are configured to expand or contract. Flexible sleeve body 410 can be compressed for storage.

Tube clamp interface 420 is at one end of flexible sleeve body 410 and is configured to connect to a tube through which refrigerant flows. As illustrated in FIGS. 4A-4D, tube clamp interface 420 may have one diameter and can be connected to tubes with only one diameter. In some other embodiments, tube clamp interface 420 may have multiple sub tube clamp interfaces with different diameters and can be connected to tubes with different diameters. Tube clamp interface 420 having multiple sub tube clamp interfaces can be similar to the tube clamp interface described in FIG. 1A and FIG. 3A.

Tube clamp interface 420 further has a recess 425 on the surface of tube clamp interface 420. Recess 425 is configured to align a hose clamp when the hose clamp is fixed onto tube clamp interface 420 so that the hose clamp will not move or fall off. For the embodiments where tube clamp interface 420 has multiple sub tube clamp interfaces, each sub tube clamp interface may have its respective recess.

Sealing collar 430 is at the other end of flexible sleeve body 410. In one embodiment, sealing collar 430 is configured to seal against the AC cabinet. In the embodiment illustrated in FIGS. 4A-4D, sealing collar 430 further comprises screw holes 435 configured to accommodate screws that can be fixed to the AC cabinet. The screw attachment can help keep mitigation sleeve 400 in place during high pressure leaks or inadvertent displacement during service. In some other embodiments, sealing collar 430 may not comprise screw holes 435. Sealing collar 430 without screw holes 435 can have a positive engagement with the AC cabinet when mitigation sleeve 400 is snapped in the AC cabinet because deformable engagement collar 450 for these embodiments may be a round shape and more pronounced to help sealing collar 430 generate a sufficient seal in conjunction with the AC cabinet.

Gusset 440 is positioned between sealing collar 430 and flexible sleeve body 410. Gusset 440 may comprise a plurality of stiffening ribs 445 between sealing collar 430 and flexible sleeve body 410. Stiffening ribs 445 are configured to provide rigidity to sealing collar 430, allowing a user to apply pressure against gusset 440 without deforming it too much, if at all.

Deformable engagement collar 450 is connected to sealing collar 430 on a side opposite to gusset 440. Deformable engagement collar 450 can deform slightly to snap mitigation sleeve 400 in the AC cabinet and help sealing collar 430 seal against the AC cabinet. When deformable engagement collar 450 is pushed into the opening on the AC cabinet, deformable engagement collar 450 can deform slightly so that it can fit into the opening. Once pushed in, deformable engagement collar 450 may return to its original form so that it can completely and tightly fill the opening, which can help sealing collar 430 create a secure and leak-proof connection between mitigation sleeve 400 and the AC cabinet.

Drip pan extension 460 is connected to sealing collar 430. Drip pan extension 460 is configured to direct liquid into a drain pan associated with the AC system. In the embodiment illustrated in FIGS. 4A-4E, the cross-section of drip pan extension 460 has a "D" shape. In some other embodiments, the cross-section of drip pan extension 460 may have a round shape, an oval shape, or any suitable shape. The shape of the cross-section of drip pan extension 460 is configured to fit the opening of the drip pan in the AC cabinet. For example, if the opening of the drip pan is "D" shaped, the cross-section of drip pan extension 460 should be "D" shaped so that drip pan extension 460 can be inserted into the "D" shaped opening of the drip pan. As another example, if the opening of the drip pan is round, the cross-section of drip pan extension 460 should be round too so that drip pan extension 460 can be inserted into the round opening of the drip pan. Although FIGS. 4A-4E show that drip pan extension 460 has a particular length, drip pan extension 460 can have any suitable length, e.g., longer than the length shown in FIGS. 4A-4E or shorter than the length shown in FIGS. 4A-4E.

Drip pan extension tongue 470 is connected to drip pan extension 460. Drip pan extension tongue 470 may tilt downwards to direct liquid into the drip pan of the AC system when mitigation sleeve 400 is connected to the AC cabinet. Drip pan extension tongue 470 can be flexible. For example, drip pan extension tongue 470 can be pushed up so that it can be inserted into the cabinet opening and slide into place. Once inserted into the cabinet opening, drip pan extension tongue 470 may then return to the tilt position to perform its intended function of directing liquid into the drip pan of the AC system.

In an embodiment, the installation of mitigation sleeve 400 may follow the following procedure. To begin with, a user may need to determine the size of the tube fits the tube clamp interface 420. The user can then slide mitigation sleeve 100 onto the refrigerant tube. Mitigation sleeve 400 should be at least two feet from the joint connecting the tube and AC coil to avoid damage during brazing of the connection if the tube and AC coil are connected using brazed connections.

For brazed connections, the user can position the refrigerant tube and make the brazed connection between the tube and AC coil following brazing guidelines. For braze-free connections, the user can position the refrigerant tube against the AC coil and follow the assembly instructions provided with a braze-free connector used to connect the tube and AC coil.

The user can then push drip pan extension tongue 470 up and insert it into the "D" shaped opening of the drip pan in the AC cabinet. The user can then insert drip pan extension 460 of mitigation sleeve 400 into the "D" shaped opening of the drip pan in the AC cabinet. The user can hold gusset 440 and push deformable engagement collar 450 into the opening on the AC cabinet. Deformable engagement collar 450 can deform slightly so that it can help sealing collar 430 seal against the AC cabinet. The user can further secure mitigation sleeve 400 to the AC cabinet by installing screws onto the AC cabinet through screw holes 435 of scaling collar 430.

The user can then fix a hose clamp onto recess 425 of tube clamp interface 420 to secure the connection of mitigation sleeve 400 to the refrigerant tube.

Figure 5A:
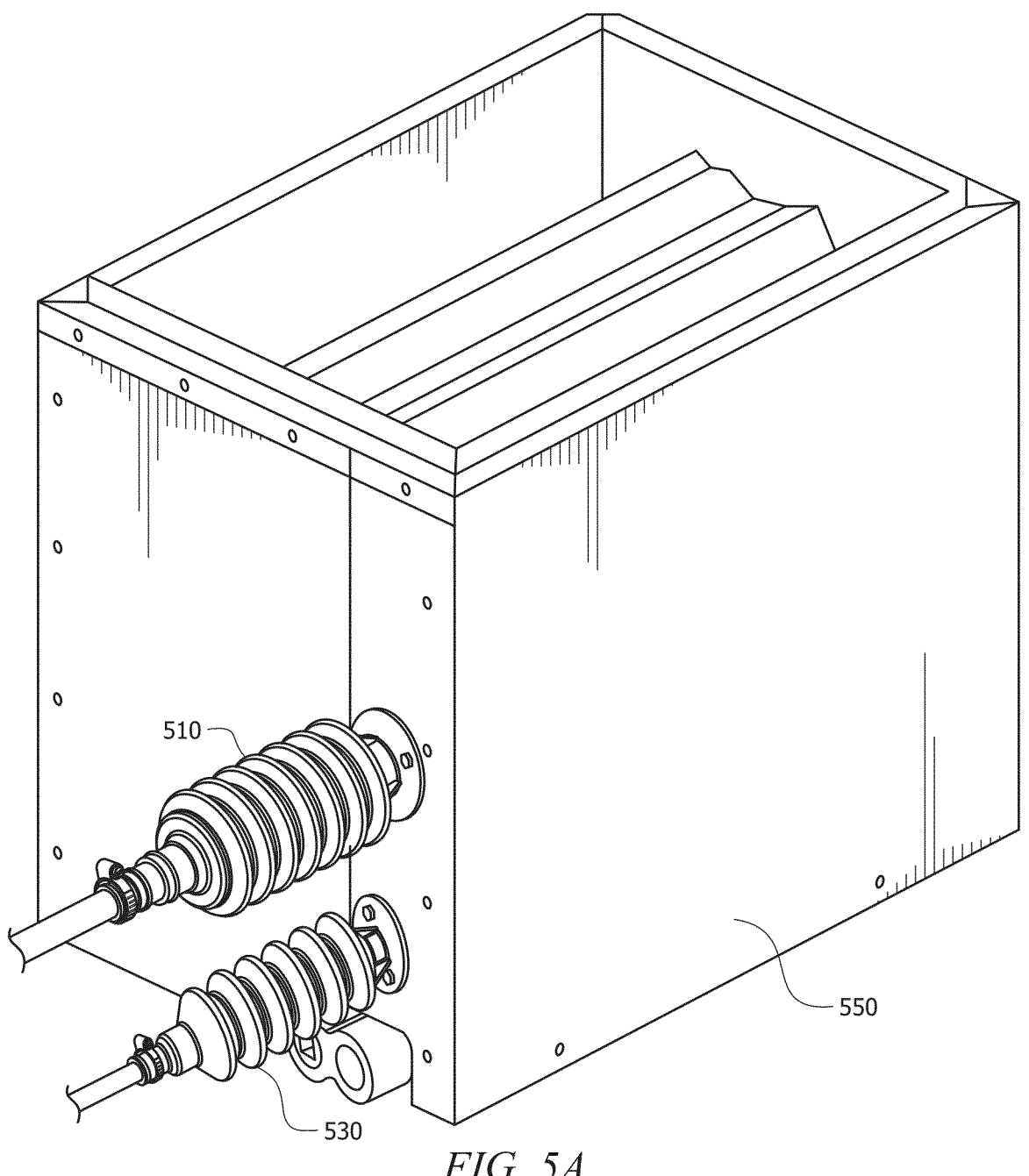
FIG. 5A illustrates an example perspective view of two mitigation sleeves connected to an air conditioning (AC) cabinet.
Figure 5B:
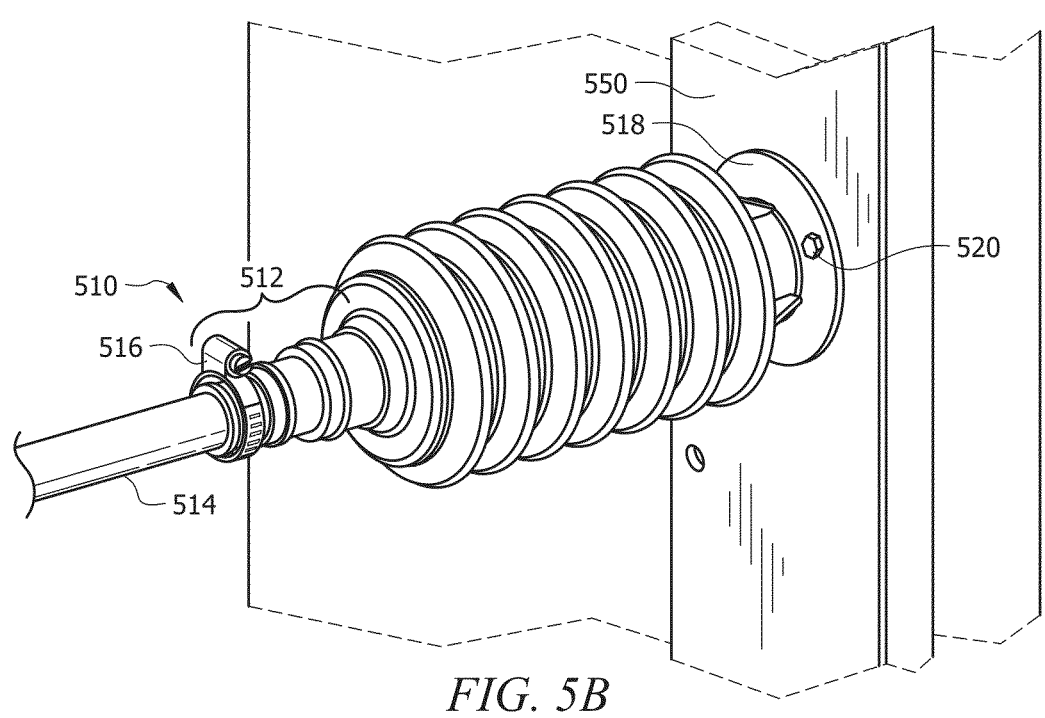
FIG. 5B illustrates an example perspective view of a first of the two mitigation sleeves in FIG. 5A connected to the AC cabinet.
Figure 5C:
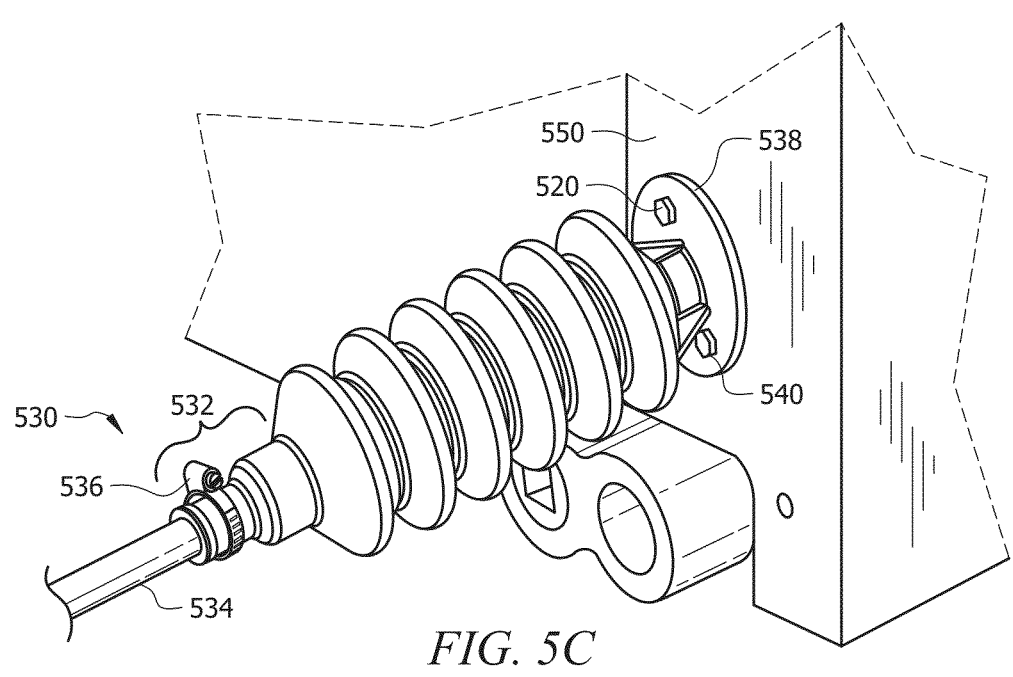
FIG. 5C illustrates an example perspective view of a second of the two mitigation sleeves in FIG. 5A connected to the AC cabinet.

FIG. 5A illustrates an example perspective view of two mitigation sleeves 510 and 530 connected to an AC cabinet 550. FIG. 5B illustrates an example perspective view of a first mitigation sleeve 510 of the two mitigation sleeves in FIG. 5A connected to the AC cabinet 550. FIG. 5C illustrates an example perspective view of a second mitigation sleeve 530 of the two mitigation sleeves in FIG. 5A connected to the AC cabinet 550.

Mitigation sleeve 510 is similar to the first embodiment described in FIGS. 1A-1B. As illustrated in FIG. 5B, tube clamp interface 512 of mitigation sleeve 510 has three sub tube clamp interfaces having three respective diameters. As a result, tube clamp interface 512 can be connected to tubes with three different diameters. Tube clamp interface 512 is directly connected to a tube 514. Tube 514 allows refrigerant to flow through. A hose clamp 516 is fixed onto tube clamp interface 512. Hose clamp 516 is aligned on a recess on the surface of tube clamp interface 512.

Sealing collar 518 of mitigation sleeve 510 is sealed against AC cabinet 550. As illustrated in FIG. 5B, sealing collar 518 further comprises screw holes configured to accommodate screws 520 fixed to AC cabinet 550. Screws 520 can help keep mitigation sleeve 510 in place during high pressure leaks or inadvertent displacement during service.

If there is a refrigerant leak inside mitigation sleeve 510 (e.g., from refrigerant tube, braze joint, or AC coil), mitigation sleeve 510 may contain the leaked refrigerant and keep the refrigerant from leaking outside the AC Cabinet. Furthermore, mitigation sleeve 510 may facilitate the refrigerant to leak back via the drip pan extension of mitigation sleeve 510 into a drip pan positioned in the AC cabinet.

Mitigation sleeve 530 is similar to the second embodiment described in FIGS. 2A-2B. As illustrated in FIG. 5C, tube clamp interface 532 of mitigation sleeve 530 has one diameter and can be connected to tubes with only one diameter. Tube clamp interface 532 is directly connected to a tube 534. Tube 534 allows refrigerant to flow through. A hose clamp 536 is fixed onto tube clamp interface 532. Hose clamp 536 is aligned on a recess on the surface of tube clamp interface 532.

The sealing collar 538 of the mitigation sleeve 530 is sealed against the AC cabinet 550. As illustrated in FIG. 5C, the sealing collar 538 further comprises screw holes configured to accommodate screws 540 fixed to the AC cabinet 550. The screws 540 can help keep the mitigation sleeve 530 in place during high pressure leaks or inadvertent displacement during service.

If there is a refrigerant leak inside mitigation sleeve 530 (e.g., from refrigerant tube, braze joint, or AC coil), mitigation sleeve 530 may contain the leaked refrigerant and keep the refrigerant from leaking outside the AC Cabinet. Furthermore, mitigation sleeve 530 may facilitate the refrigerant to leak back via the drip pan extension of mitigation sleeve 530 into the drip pan positioned in the AC cabinet.

Figure 6:
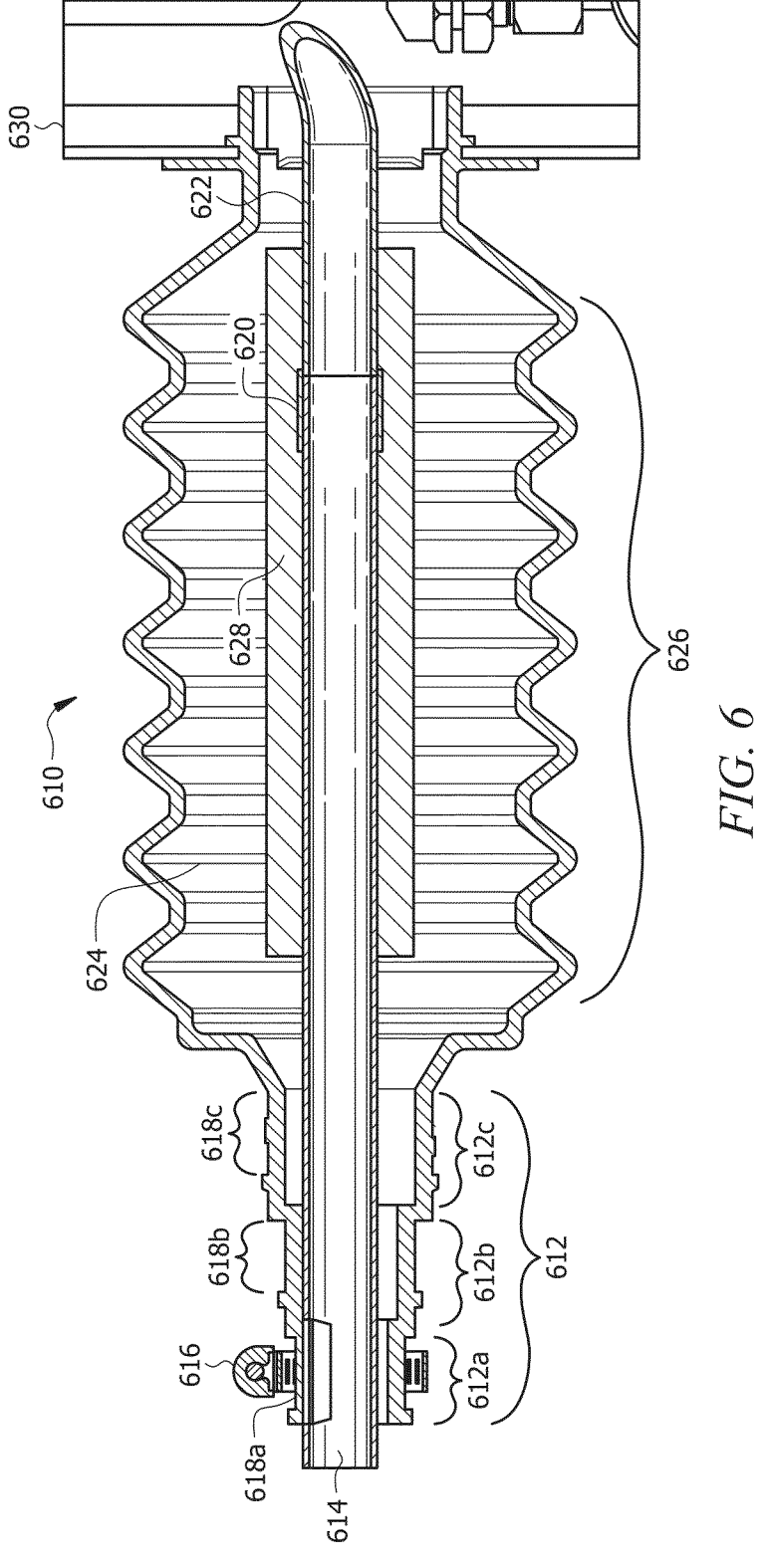
FIG. 6 illustrates an example cross-section view of the mitigation sleeve connected to the AC cabinet.

FIG. 6 illustrates an example cross-section view of the mitigation sleeve 610 connected to the AC cabinet 630. Tube clamp interface 612 of mitigation sleeve 610 has three sub tube clamp interfaces (612a-612c) having three respective diameters. Tube clamp interface 612 is connected to a tube 614. Tube 614 allows refrigerant to flow through. A hose clamp 616 is fixed onto tube clamp interface 612. Hose clamp 616 may be aligned on a recess 618a on the surface of sub tube clamp interface 612a. Similarly, hose clamp 616 may be aligned on a recess 618b on the surface of sub tube clamp interface 612b. Finally, hose clamp 616 may be aligned on a recess 618c on the surface of sub tube clamp interface 612c.

Tube 614 is connected via a braze joint 620 to an AC coil 622 associated with an AC system. Braze joint 620 is within the internal cavity 624 of flexible sleeve body 626. Tube 614 and AC coil 622 allow refrigerant to flow through tube 614 and AC coil 622. The internal cavity 624 of flexible sleeve body 626 can contain any refrigerant leak from the braze joint 620.

If there is a refrigerant leak at braze joint 620, mitigation sleeve 610 may contain the leaked refrigerant and keep the refrigerant from leaking outside the AC Cabinet. Furthermore, mitigation sleeve 610 may facilitate the refrigerant to leak back via the drip pan extension of mitigation sleeve 610 into the drip pan positioned in the AC cabinet.

There may be insulation 628 wrapped around some or part of tube 614, braze joint 620, and AC coil 622. The refrigerant flowing through the refrigerant tube may be cold, which may cause moisture accumulated on the tube and potentially water dripping or mold on the tube. Insulation 628 can help keep moisture from accumulating outside the refrigerant tube. As shown in FIG. 6, the internal cavity 624 of flexible sleeve body 626 has a volume size that is large enough to accommodate insulation 628.

Figure 7A:
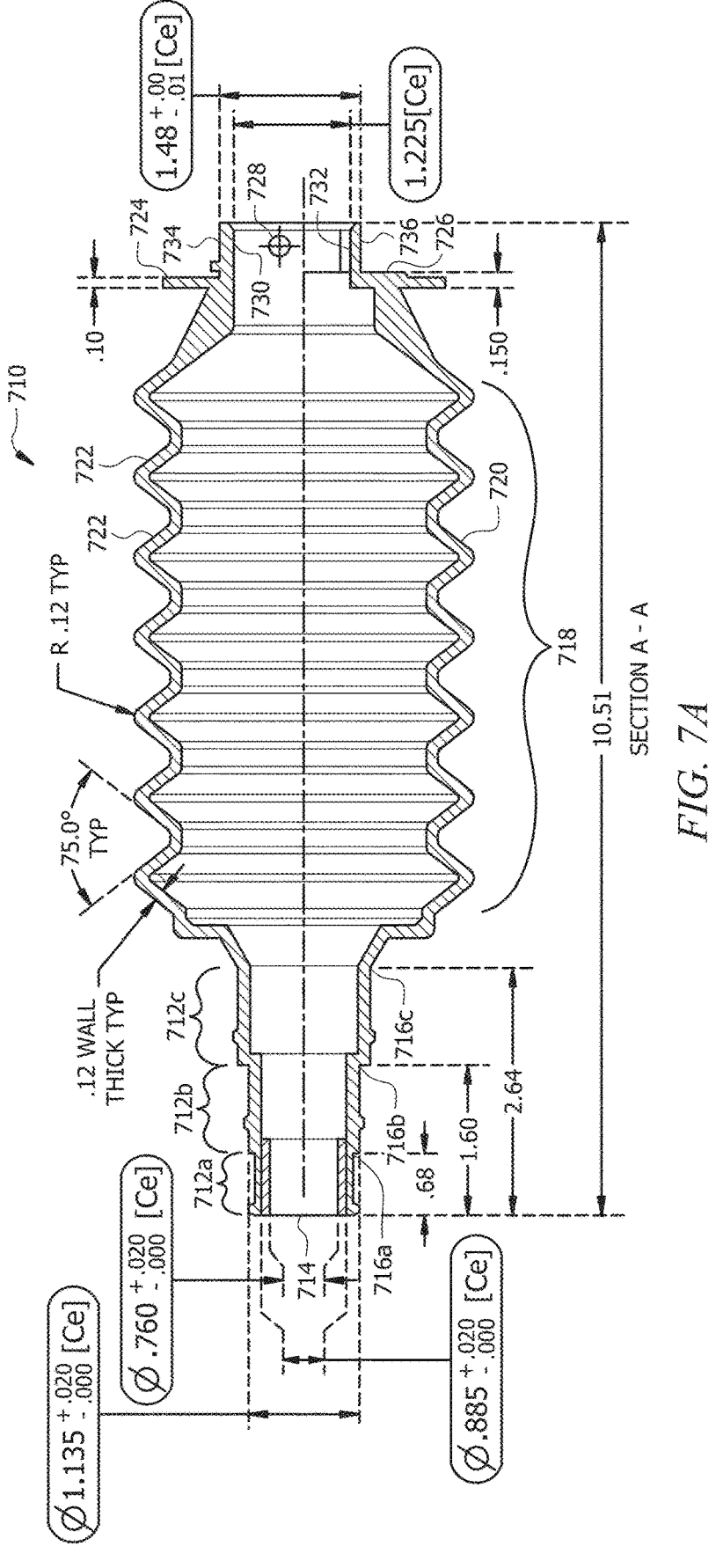
FIG. 7A illustrates an example cross-section view with dimensional measurements of the mitigation sleeve according to the first embodiment of the present disclosure.

FIG. 7A illustrates an example cross-section view with dimensional measurements of the mitigation sleeve 710 according to the first embodiment of the present disclosure. In this example, the overall length of mitigation sleeve 710 is 10.51 inches (26.6954 cm). Mitigation sleeve 710 has three sub tube clamp interfaces 712a, 712b, and 712c having three respective diameters. In this example, sub tube clamp interface 712a has a diameter of 0.760 inches (1.9304 cm) with +0.020 or −0.000 tolerance; sub tube clamp interface 712b has a diameter of 0.885 inches (2.2479 cm) with +0.020 or −0.000 tolerance; and sub tube clamp interface 712c has a diameter of 1.135 inches (2.8829 cm) with +0.020 or −0.000 tolerance. The length from opening 714 of tube clamp interface 712 to end 716a of sub tube clamp interface 712a is 0.68 inches (1.7272 cm). The length from opening 714 of tube clamp interface 712 to end 716b of sub tube clamp interface 712b is 1.60 inches (4.064 cm). The length from opening 714 of tube clamp interface 712 to end 716c of sub tube clamp interface 712c is 2.64 inches (6.7056 cm).

Flexible sleeve body 718 has a wall 720. In one embodiment, the typical wall thickness is 0.12 inches (0.3048 cm). Any two adjacent bellow elements 722 form an angle, which is typically 75.0 degrees (1.309 rad). The peak of each bellow element 722 is curved, with a typical radius of 0.12 inches. The thickness of sealing collar 724 is 0.10 inches (0.254 cm). The thickness of scaling collar 724 plus the thickness of deformable engagement collar 726 is 0.150 inches (0.381 cm). The height between the top inner surface 730 of drip pan extension 728 and the bottom inner surface 732 of drip pan extension 728 is 1.225 inches (3.1115 cm). The height between the top outer surface 734 of drip pan extension 728 and the bottom outer surface 736 of drip pan extension 728 is 1.48 inches (3.7592 cm) with +0.00 or −0.01 tolerance.

Figure 7B:
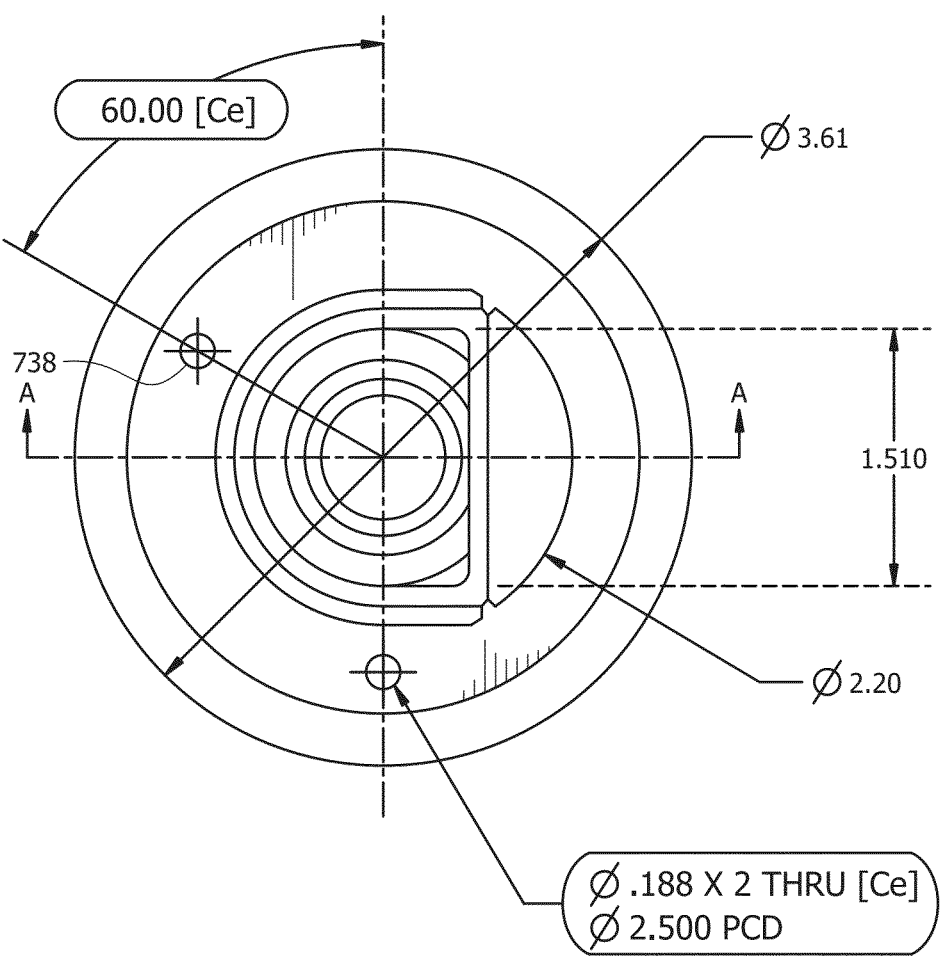
FIG. 7B illustrates an example front view with dimensional measurements of the sealing collar and drip pan extension of the mitigation sleeve of FIG. 7A.

FIG. 7B illustrates an example front view with dimensional measurements of the sealing collar and drip pan extension of the mitigation sleeve of FIG. 7A. The diameter formed by the peak of bellow elements 722 is 3.61 inches (9.1694 cm). The circular part of the "D" shape of drip pan extension 728 has a diameter of 2.20 inches (5.588 cm). The straight line of the "D" shape of drip pan extension 728 has a length of 1.510 inches (3.8354 cm). Each screw hole 738 has a diameter of 0.188 inches (4.7752 cm). The pitch circle diameter for each screw hole 738 is 2.500 inches (6.35 cm).

Figure 7C:
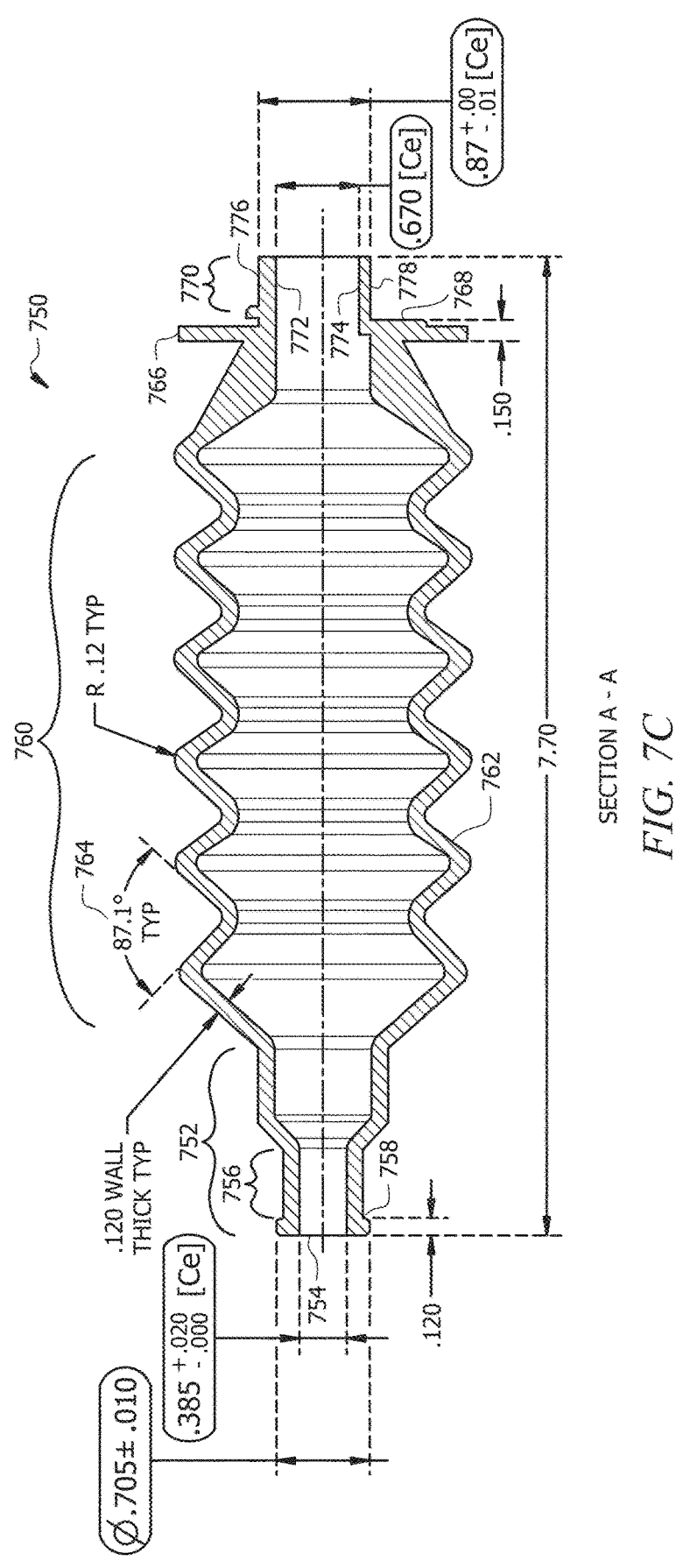
FIG. 7C illustrates an example cross-section view with dimensional measurements of the mitigation sleeve according to the second embodiment of the present disclosure.

FIG. 7C illustrates an example cross-section view with dimensional measurements of the mitigation sleeve 750 according to the second embodiment of the present disclosure. The overall length of mitigation sleeve 750 is 7.70 inches (19.558 cm). Tube clamp interface 752 of mitigation sleeve 750 has a diameter of 0.385 inches (0.9779 cm) with +0.020 or −0.000 tolerance, measured from the inner surface. Opening 754 of tube clamp interface 752 has a diameter of 0.705 inches (1.7907 cm) with +0.010, measured from the outer surface. The length from opening 754 to one end 758 of recess 756 is 0.120 inches (0.3048 cm).

Flexible sleeve body 760 has a wall 762. The typical wall thickness is 0.12 inches (0.3048 cm). Any two adjacent bellow elements 764 form an angle, which is typically 87.1 degrees (1.520182 rad). The peak of each bellow element 764 is curved, with a typical radius of 0.12 inches (0.3048 cm). The thickness of sealing collar 766 plus the thickness of deformable engagement collar 768 is 0.150 inches (0.381 cm). The height between the top inner surface 772 of drip pan extension 770 and the bottom inner surface 774 of drip pan extension 770 is 0.670 inches (1.7018 cm). The height between the top outer surface 776 of drip pan extension 770 and the bottom outer surface 778 of drip pan extension 770 is 0.87 inches (2.2098 cm) with +0.00 or −0.01 tolerance.

Figure 7D:
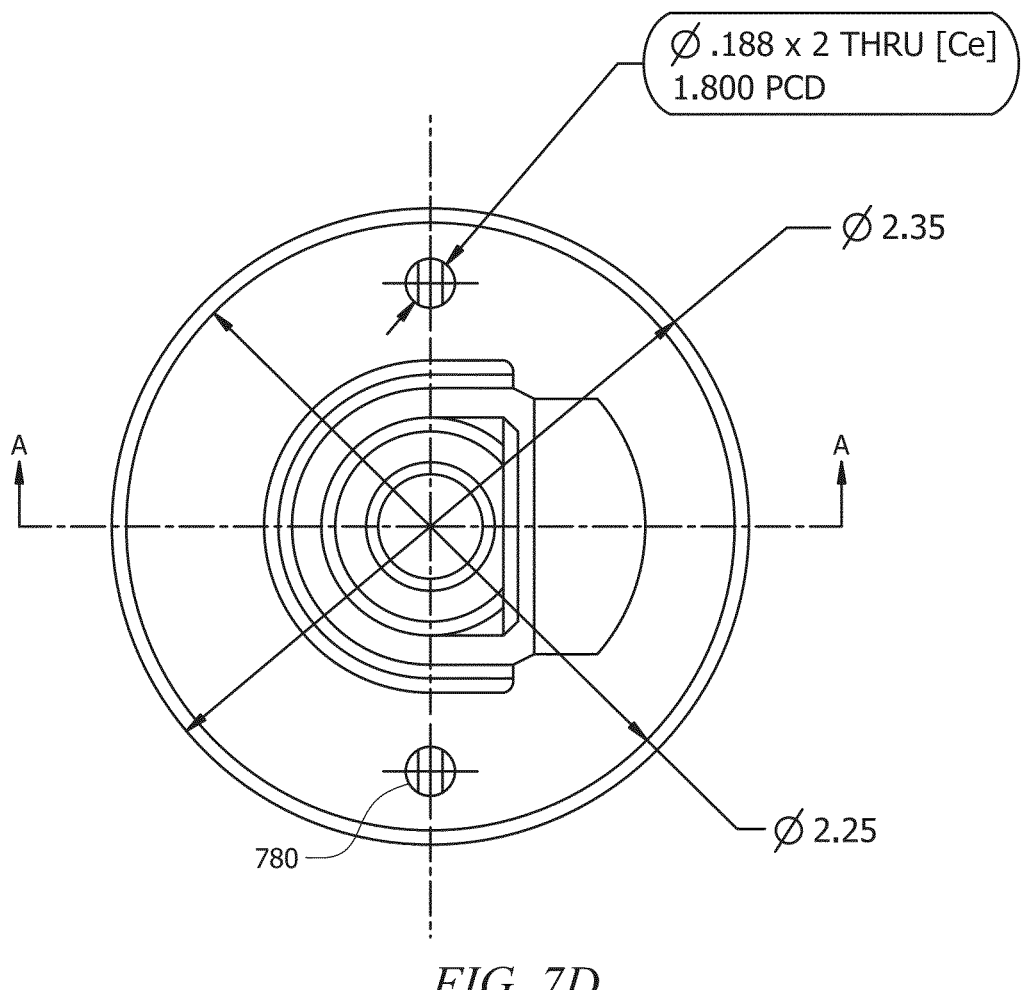
FIG. 7D illustrates an example front view with dimensional measurements of the sealing collar and drip pan extension of the mitigation sleeve of FIG. 7C.

FIG. 7D illustrates an example front view with dimensional measurements of the sealing collar and drip pan extension of the mitigation sleeve of FIG. 7C. The diameter formed by the peak of bellow elements 764 is 2.35 inches (5.969 cm), measured from the outer surface. The diameter formed by the peak of bellow elements 764 is 2.25 inches (5.715 cm), measured from the inner surface. Each screw hole 780 has a diameter of 0.188 inches (0.47752 cm). The pitch circle diameter for each screw hole 780 is 1.800 inches (4.572 cm).

Figure 8:
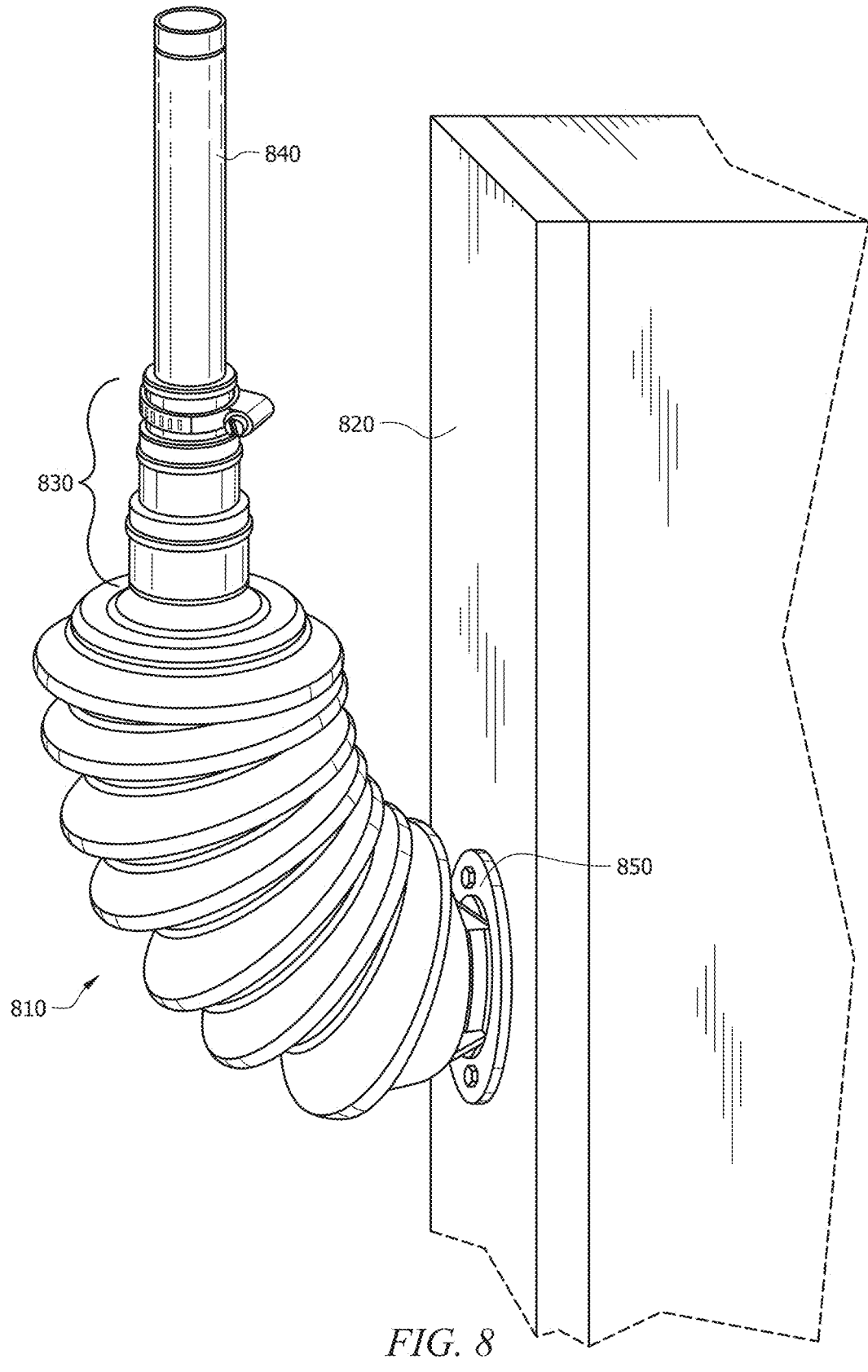
FIG. 8 illustrates an example side view of a bent mitigation sleeve connected to the AC cabinet.

FIG. 8 illustrates an example side view of a bent mitigation sleeve 810 connected to an AC cabinet 820. Mitigation sleeve 810 has three sub tube clamp interfaces having three respective diameters. As a result, tube clamp interface 830 can be connected to tubes with three different diameters. The tube clamp interface 830 is directly connected to a tube 840. Tube 840 allows refrigerant to flow through. Sealing collar 850 of mitigation sleeve 810 is sealed against AC cabinet 820. Mitigation sleeve 810 is bent to a degree that is between 0 and 90 (1.5708 rad).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "operation for" are explicitly used in the particular claim.

The invention claimed is:

1. A mitigation sleeve, comprising:

a flexible sleeve body comprising a plurality of bellow elements, wherein the flexible sleeve body includes a cavity configured to contain fluid, and wherein the plurality of bellow elements are configured to expand or contract;

a tube clamp interface at a first end of the flexible sleeve body, wherein the tube clamp interface comprises a first diameter and is configured to receive a tube;

a sealing collar at a second end of the flexible sleeve body;

a gusset positioned between the sealing collar and the flexible sleeve body, wherein the gusset comprises a plurality of stiffening ribs; and a deformable engagement collar connected to the sealing collar on a side opposite to the gusset;

wherein the deformable engagement collar connected to the sealing collar is configured to seal against an air conditioning (AC) cabinet associated with an AC system, and wherein the mitigation sleeve further comprises a drip pan extension connected to the sealing collar, wherein the drip pan extension is configured to direct liquid into a drain pan associated with the AC system.

2. The mitigation sleeve of claim 1, wherein the tube clamp interface comprises an inner surface, wherein the first diameter is a measurement of the inner surface of the tube clamp interface.

3. The mitigation sleeve of claim 2, wherein:

the tube clamp interface is configured to receive a tube comprising an outer surface;

the outer surface of the tube has a second diameter; and the first diameter is greater than the second diameter by a threshold amount.

4. The mitigation sleeve of claim 1, wherein:

the tube clamp interface comprises a first sub tube clamp interface having a second diameter and a second sub tube clamp interface having a third diameter;

the first sub tube clamp interface comprises a first inner surface;

the second sub tube clamp interface comprises a second inner surface;

the second diameter is a measurement of the first inner surface of the first sub tube clamp interface; and the third diameter is a measurement of the second inner surface of the second sub tube clamp interface.

5. The mitigation sleeve of claim 4, wherein:

the first sub tube clamp interface is configured to receive a first tube comprising a first outer surface;

the first outer surface of the first tube has a fourth diameter, the second diameter being greater than the fourth diameter by a threshold amount;

the second sub tube clamp interface is configured to receive a second tube comprising a second outer surface; and the second outer surface of the second tube has a fifth diameter, the third diameter being greater than the fifth diameter by the threshold amount.

6. The mitigation sleeve of claim 1, wherein the tube clamp interface comprises a recess on a surface of the tube clamp interface, and wherein the recess is configured to align a hose clamp when the hose clamp is fixed onto the tube clamp interface.

7. The mitigation sleeve of claim 1, wherein the deformable engagement collar connected to the sealing collar is configured to seal against an air conditioning (AC) cabinet associated with an AC system, and wherein the sealing collar further comprises one or more screw holes configured to accommodate one or more screws that can be fixed to the AC cabinet.

8. The mitigation sleeve of claim 1, wherein the deformable engagement collar connected to the sealing collar is configured to seal against an air conditioning (AC) cabinet associated with an AC system, and wherein the mitigation sleeve further comprises a drip pan extension tongue connected to the drip pan extension, wherein the drip pan extension tongue tilts downwards to direct liquid into the drip pan when the mitigation sleeve is connected to the AC cabinet.

9. The mitigation sleeve of claim 1, wherein a cross-section of the drip pan extension has a "D" shape.

10. The mitigation sleeve of claim 1, wherein a cross-section of the drip pan extension has a circular shape.

11. The mitigation sleeve of claim 1, wherein a cross-section of the drip pan extension has an oval shape.

12. The mitigation sleeve of claim 1, wherein the flexible sleeve body, the tube clamp interface, the sealing collar, the gusset, the deformable engagement collar, and the drip pan extension are integrated as a unified sleeve.

13. The mitigation sleeve of claim 1, wherein at least a portion of the mitigation sleeve is formed from molded rubber.

14. The mitigation sleeve of claim 1, wherein the flexible sleeve body is bendable.

15. The mitigation sleeve of claim 1, wherein a volume size of the cavity of the flexible sleeve body is configured to accommodate insulation surrounding the tube connected to the tube clamp interface that extends into the cavity of the flexible sleeve body.

16. The mitigation sleeve of claim 15, wherein the tube is connected via a braze joint within the cavity to an air conditioning (AC) coil associated with an AC system.

17. The mitigation sleeve of claim 16, wherein the tube and AC coil are configured to allow refrigerant to flow through the tube and AC coil, and wherein the cavity of the flexible sleeve body is configured to contain any refrigerant leak from the braze joint.

18. The mitigation sleeve of claim 1, wherein the plurality of stiffening ribs of the gusset are configured to provide rigidity to the sealing collar.

19. The mitigation sleeve of claim 1, wherein the deformable engagement collar connected to of the sealing collar is configured to seal against an air conditioning (AC) cabinet associated with an AC system, and wherein the deformable engagement collar is configured to deform to enable the sealing collar to seal against the AC cabinet.

20. A mitigation sleeve, comprising:

a flexible sleeve body comprising a plurality of bellow elements, wherein the flexible sleeve body includes a cavity configured to contain liquid, and wherein the plurality of bellow elements are configured to expand or contract:

a tube clamp interface at a first end of the flexible sleeve body, wherein the tube clamp interface comprises a plurality of sub tube clamp interfaces having a plurality of respective diameters, wherein the plurality of sub tube clamp interfaces are configured to receive a plurality of respective tubes:

a sealing collar at a second end of the flexible sleeve body, wherein the sealing collar further comprises one or more screw holes configured to accommodate one or more screws that can be fixed to an AC cabinet associated with an AC system:

a gusset positioned between the sealing collar and the flexible sleeve body, wherein the gusset comprises a plurality of stiffening ribs;

a deformable engagement collar connected to the sealing collar on a side opposite to the gusset, wherein the deformable engagement collar is configured to seal against the AC cabinet; and a drip pan extension connected to the sealing collar, wherein the drip pan extension is configured to direct liquid into a drain pan associated with the AC system, and wherein a cross-section of the drip pan extension has a "D" shape.

21. A mitigation sleeve, comprising:

a flexible sleeve body comprising a plurality of bellow elements, wherein the flexible sleeve body includes a cavity configured to contain liquid, and wherein the plurality of bellow elements are configured to expand or contract;

a tube clamp interface at a first end of the flexible sleeve body, wherein the tube clamp interface comprises a first diameter and is configured to receive a tube, wherein the tube clamp interface comprises a recess on a surface of the tube clamp interface, and wherein the recess is configured to align a hose clamp when the hose clamp is fixed onto the tube clamp interface;

a sealing collar at a second end of the flexible sleeve body;

a gusset positioned between the sealing collar and the flexible sleeve body, wherein the gusset comprises a plurality of stiffening ribs;

a deformable engagement collar connected to the sealing collar on a side opposite to the gusset, wherein the deformable engagement collar is configured to seal against an air conditioning (AC) cabinet associated with an AC system;

a drip pan extension connected to the sealing collar; and a drip pan extension tongue connected to the drip pan extension, wherein the drip pan extension tongue tilts downwards to direct liquid into a drain pan associated with the AC system when the mitigation sleeve is connected to the AC cabinet.

* * * * *